(12) United States Patent
Takeuchi

(10) Patent No.: US 8,638,013 B2
(45) Date of Patent: Jan. 28, 2014

(54) ELECTROMECHANICAL DEVICE, ACTUATOR USING THE SAME, AND MOTOR

(75) Inventor: Kesatoshi Takeuchi, Shiojiri (JP)

(73) Assignee: Seiko Epson Corporation (JP)

( * ) Notice: Subject to any disclaimer, the term of this patent is extended or adjusted under 35 U.S.C. 154(b) by 211 days.

(21) Appl. No.: 13/236,967

(22) Filed: Sep. 20, 2011

(65) Prior Publication Data
US 2012/0074820 A1    Mar. 29, 2012

(30) Foreign Application Priority Data

Sep. 24, 2010  (JP) ................................. 2010-213965

(51) Int. Cl.
*H02K 7/10*  (2006.01)
(52) U.S. Cl.
USPC .......................................... 310/75 R; 310/83
(58) Field of Classification Search
USPC ................................................. 310/83, 75 R
See application file for complete search history.

(56) References Cited

U.S. PATENT DOCUMENTS

| | | | | |
|---|---|---|---|---|
| 5,719,459 A | * | 2/1998 | Hasegawa | 310/268 |
| 2001/0052735 A1 | * | 12/2001 | Sakamoto | 310/75 R |
| 2004/0149079 A1 | * | 8/2004 | Bolz | 74/640 |
| 2010/0187954 A1 | * | 7/2010 | Kendall et al. | 310/67 R |

FOREIGN PATENT DOCUMENTS

JP    2008-159847    7/2008

* cited by examiner

*Primary Examiner* — Nguyen N Hanh
(74) *Attorney, Agent, or Firm* — Harness, Dickey & Pierce, P.L.C.

(57) ABSTRACT

An electromechanical device includes a central shaft; a rotor having a rotor magnet disposed along the periphery of the central shaft; a stator disposed on the periphery of the rotor; and a rotation mechanism connected to the rotor and used for transfer of a rotational driving force, wherein in the rotor, between the central shaft and the rotor magnet, a space which opens in at least one of an axial direction of the central shaft and houses at least part of the rotation mechanism is formed.

9 Claims, 19 Drawing Sheets

ELECTROMECHANICAL DEVICE, ACTUATOR USING THE SAME, AND MOTOR

BACKGROUND

1. Technical Field

The present invention relates to electromechanical devices.

2. Related Art

As a power source that drives joints of a robot, a motor is usually used (JP-A-2008-159847 etc.). In general, the motor is used by being connected to a rotation mechanism such as a speed reducer that adjusts the rotation speed and torque of the motor. To make the robot smaller, it is preferable to make an electromechanical device converting electric power to and from power more compact, the electromechanical device formed of the motor and the rotation mechanism connected thereto. So far ingenuity has not been fully exercised to meet such needs.

SUMMARY

An advantage of some aspects of the invention is to provide a technique capable of miniaturizing an electromechanical device.

Application Example 1

This application example of the invention is directed to an electromechanical device including a central shaft; a rotor having a rotor magnet disposed along the periphery of the central shaft; a stator disposed on the periphery of the rotor; and a rotation mechanism connected to the rotor and used for transfer of a rotational driving force, wherein in the rotor, between the central shaft and the rotor magnet, a space which opens in at least one of an axial direction of the central shaft and houses at least part of the rotation mechanism is formed.

According to this electromechanical device, at least part of the rotation mechanism is housed in the space of the rotor, and the rotor generating the rotation and the rotation mechanism transferring the rotation are integrally formed. This makes the electromechanical device smaller.

Application Example 2

This application example of the invention is directed to the electromechanical device described in Application Example 1, wherein the central shaft has a through hole extending in the axial direction of the central shaft, and a conductive line sending electricity for controlling the rotation of the rotor is placed through the through hole.

According to this electromechanical device, since the conductive line for controlling the rotation of the rotor is placed through the central shaft, the conductive line is prevented from being exposed to the outside, whereby the conductive line is protected more properly and can be laid more easily. Moreover, doing so eliminates the possibility that the exposed conductive line impairs the design of an apparatus into which the electromechanical device is incorporated.

Application Example 3

This application example of the invention is directed to the electromechanical device described in Application Example 1 or 2, wherein the rotation mechanism includes a planet gear having a sun gear integrally provided in the rotor and a planetary gear and an outer gear which are disposed in the space and functioning as a speed-increasing gear or a speed reducer.

According to this electromechanical device, since the planet gear and the rotor are formed integrally, the electromechanical device is made smaller.

Application Example 4

This application example of the invention is directed to the electromechanical device described in Application Example 1 or 2, wherein the rotation mechanism includes a harmonic drive mechanism having a wave generator integrally provided in the rotor and a flexible spline and a circular spline which are disposed in the space.

According to this electromechanical device, since a Harmonic Drive® mechanism and the rotor are integrally formed, the electromechanical device is made smaller.

Application Example 5

This application example of the invention is directed to an actuator including the electromechanical device described in any one of Application Examples 1 to 4.

According to this actuator, since the electromechanical device which is made smaller is used as a drive source, it is possible to make the actuator more compact.

Application Example 6

This application example of the invention is directed to a motor including a central shaft; a rotor having a rotor magnet disposed along the periphery of the central shaft; and a stator disposed on the periphery of the rotor; wherein between the central shaft and the rotor magnet, a space which opens in at least one of an axial direction of the central shaft and houses at least part of a rotation mechanism connected to the rotor and used for transfer of a rotational driving force is formed.

With this motor, the rotor and the rotation mechanism can be formed integrally and made to be more compact.

The invention can be implemented in various forms. For example, the invention can be implemented as an electromechanical device such as a motor and a power generator and an actuator, a robot, a mobile unit, etc. that use such an electromechanical device.

BRIEF DESCRIPTION OF THE DRAWINGS

The invention will be described with reference to the accompanying drawings, wherein like numbers reference like elements.

DESCRIPTION OF EXEMPLARY EMBODIMENTS

A. First Embodiment

Figure 1A:
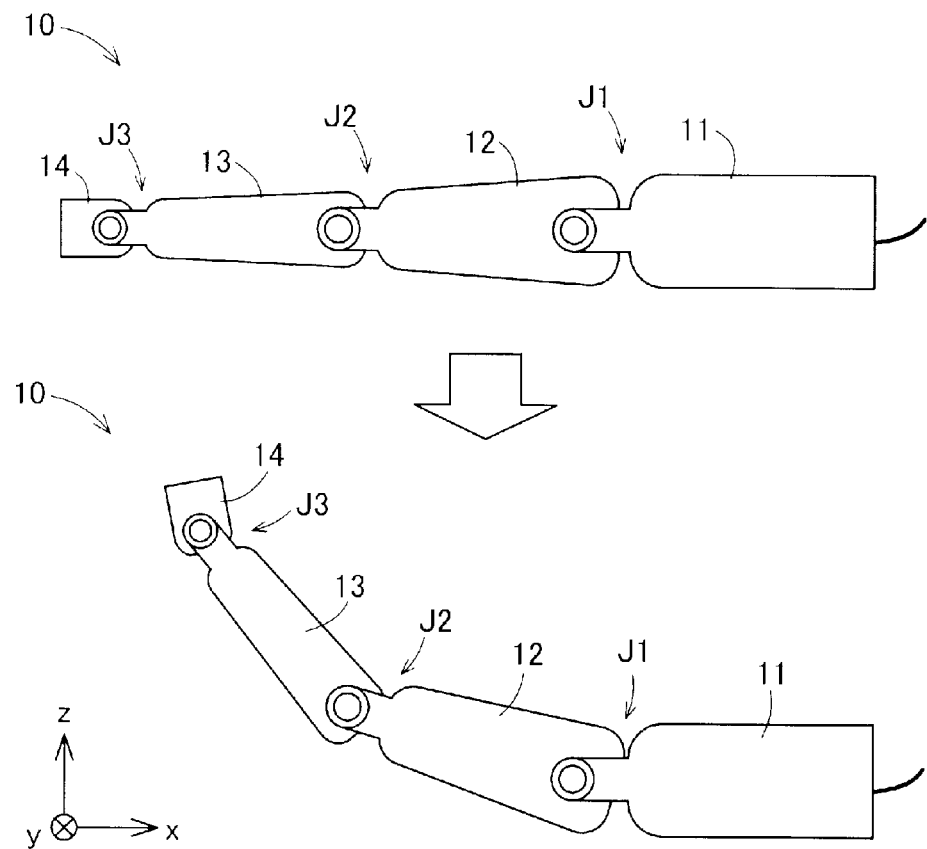
FIGS. 1A and 1B are schematic diagrams showing the structure of a robotic arm in a first embodiment.
Figure 1B:
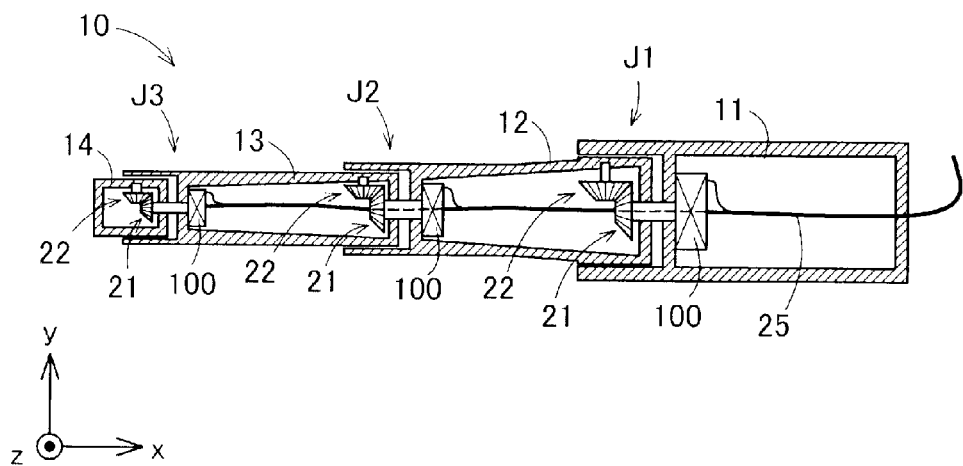

FIGS. 1A and 1B are schematic diagrams showing the structure of a robotic arm 10 as an embodiment of the invention. FIG. 1A is a schematic diagram showing the transformation of the robotic arm 10, and shows the robotic arm 10 before transformation and the robotic arm 10 after transformation. Incidentally, in FIG. 1A, three-dimensional arrows x, y, and z which are perpendicular to one another are shown.

The robotic arm 10 includes four base sections 11 to 14. The four base sections 11 to 14 are connected in series via first to third joint sections J1 to J3. Hereinafter, in the robotic arm 10, a side on which the first base section 11 is located is referred to as a "rear end side" and a side on which the fourth base section 14 is located is referred to as a "front end side".

The robotic arm 10 is transformed as a whole into a curved shape due to changes in the connection angles of the base sections 11 to 14 as a result of the joint sections J1 to J3 being turned. Incidentally, in FIG. 1A, as the robotic arm 10 after transformation, a state in which the robotic arm 10 is bent toward an upper portion of the drawing is shown.

FIG. 1B is a schematic sectional view showing an internal structure of the robotic arm 10. Incidentally, in FIG. 1B, three-dimensional arrows x, y, and z are shown so as to correspond to those in FIG. 1A. The base sections 11 to 14 are hollow and each house a power generating apparatus 100, which is a power source of each of the joint sections J1 to J3, and two bevel gears 21 and 22 to which a driving force from the power generating apparatus 100 is transferred. Hereinafter, the structure of the first joint section J1 connecting the first and second base sections 11 and 12 will be described. Incidentally, the structures of the second joint section J2 connecting the second and third base sections 12 and 13 and the third joint section J3 connecting the third and fourth base sections 13 and 14 are the same as the structure of the first joint section J1, and therefore description thereof will be omitted.

The power generating apparatus 100 has a motor that generates a rotational driving force by an electromagnetic force. A detailed internal structure of the power generating apparatus 100 will be described later. The power generating apparatus 100 is disposed on the front end side of the first base section 11 and is connected to a rotating shaft of the first bevel gear 21. The first bevel gear 21 is disposed in such a way that the rotating shaft thereof passes through the boundary between the first and second base sections 11 and 12, and a gear wheel section (a gear section) provided at the tip of the rotating shaft is disposed in the second base section 12.

The second bevel gear 22 is fixedly attached to an inner wall surface of the second base section 12 on the rear end side of the second base section 12 in such a way that the gear section thereof is connected to the gear section of the first bevel gear 21. The first bevel gear 21 rotates by a rotational driving force transferred from the power generating apparatus 100. As a result of the rotation of the first bevel gear 21, the second bevel gear 22 rotates and the second base section 12 turns.

Incidentally, a conductive line bundle 25 which is a bundle of conductive lines for sending electric power and a control signal to each power generating apparatus 100 is placed through the robotic arm 10. Specifically, the conductive line bundle 25 is placed through the first base section 11 from the rear end side, and part of the conductive lines of the conductive line bundle 25 is branched off from the bundle and is connected to a connection of the power generating apparatus 100 in the first base section 11. The remaining conductive lines of the conductive line bundle 25 extend to the second base section 12 by passing through a through hole (which will be described later) passing through the center of the power generating apparatus 100 and a through hole (not shown) passing through a central shaft of the first bevel gear 21.

The conductive line bundle 25 is disposed also in the second base section 12 in the same manner. That is, part of the conductive lines of the conductive line bundle 25 placed through the second base section 12 is connected to the power generating apparatus 100, and the remaining conductive lines of the conductive line bundle 25 are placed through the third base section 13 after passing through the power generating apparatus 100 and the first bevel gear 21. Then, the conductive line bundle 25 placed through the third base section 13 is connected to the power generating apparatus 100.

Figure 2A:
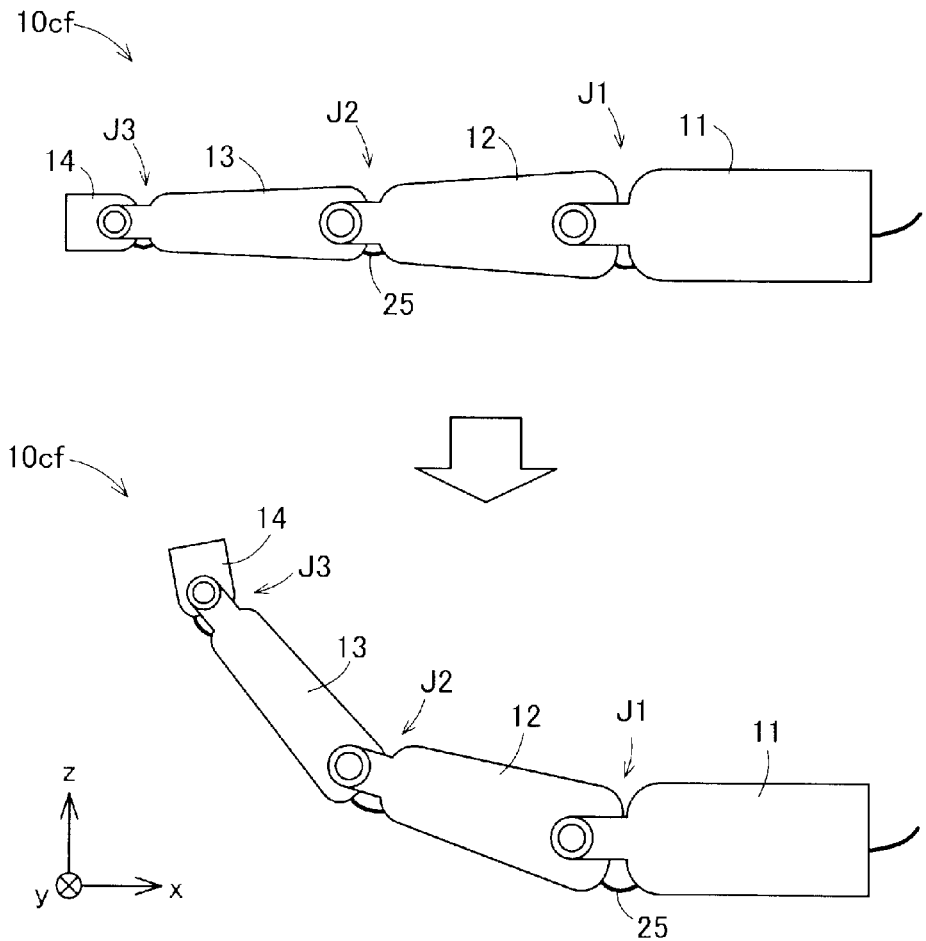
FIGS. 2A and 2B are schematic diagrams showing the structure of a robotic arm as a reference example.
Figure 2B:
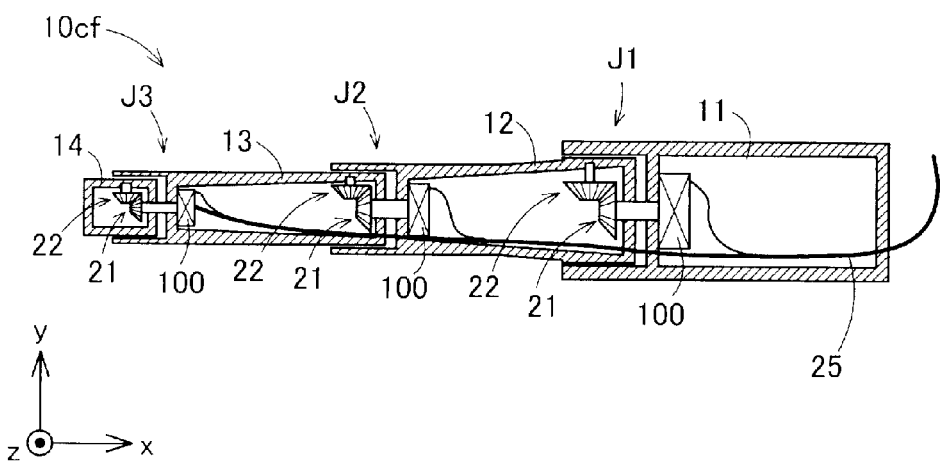

FIGS. 2A and 2B are schematic diagrams showing a robotic arm 10cf as a reference example of this embodiment. FIGS. 2A and 2B are almost the same as FIGS. 1A and 1B except that the conductive line bundle 25 is disposed outside the power generating apparatus 100 and the first bevel gear 21.

In the robotic arm 10cf of this reference example, the conductive line bundle 25 is exposed to the outside at the joint sections J1 to J3. As a result, there is a possibility that the conductive line bundle 25 deteriorates by getting caught in the base sections 11 to 14 at the joint sections J1 to J3 with the transformation of the robotic arm 10cf. Moreover, there is a possibility that the conductive line bundle 25 exposed to the outside impairs the design of the robotic arm 10cf. However, with the robotic arm 10 of this embodiment, possibilities of such a problem are avoided because the conductive line bundle 25 is not exposed to the outside.

Figure 3:
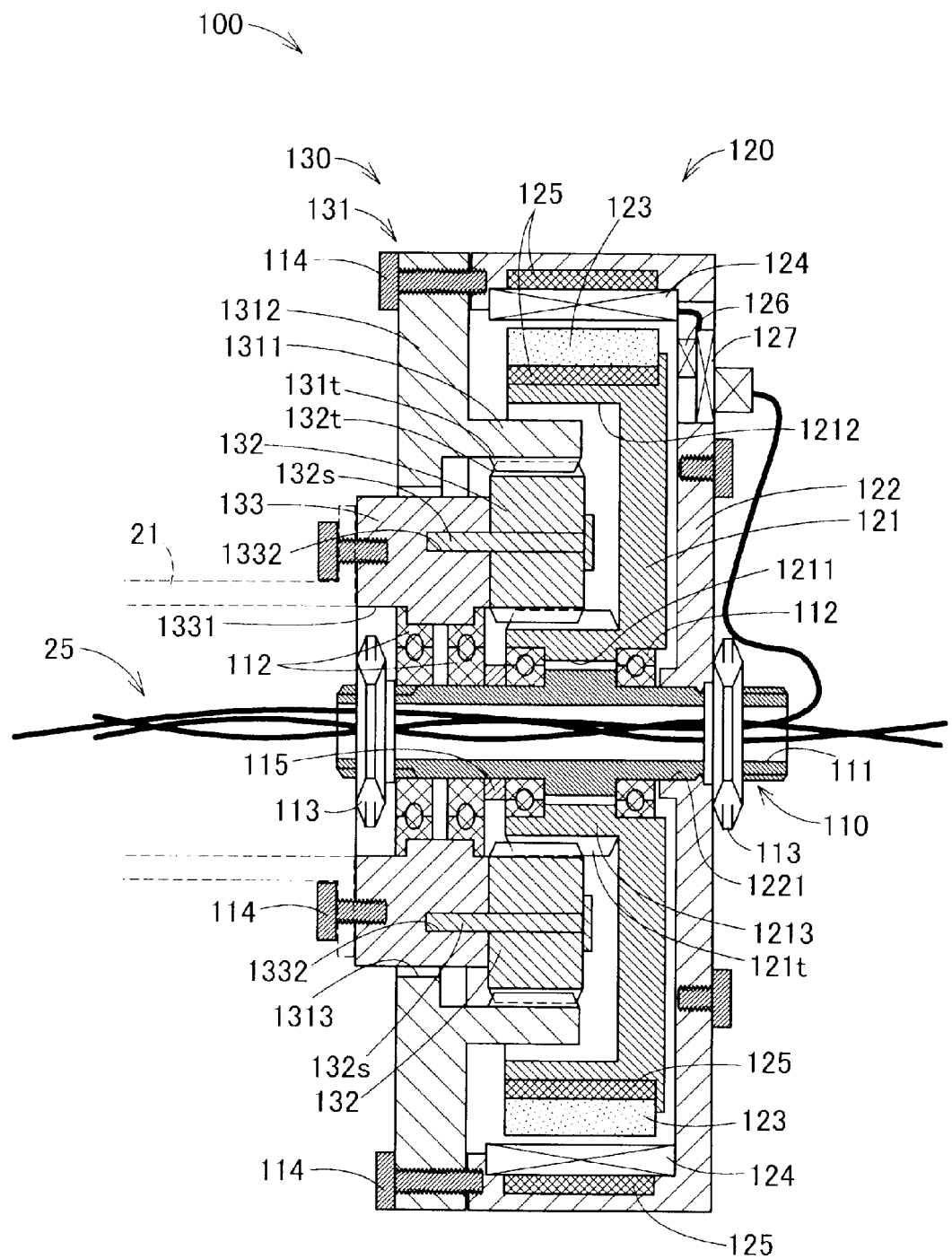
FIG. 3 is a schematic sectional view showing an internal structure of a power generating apparatus of the first embodiment.
Figure 4:
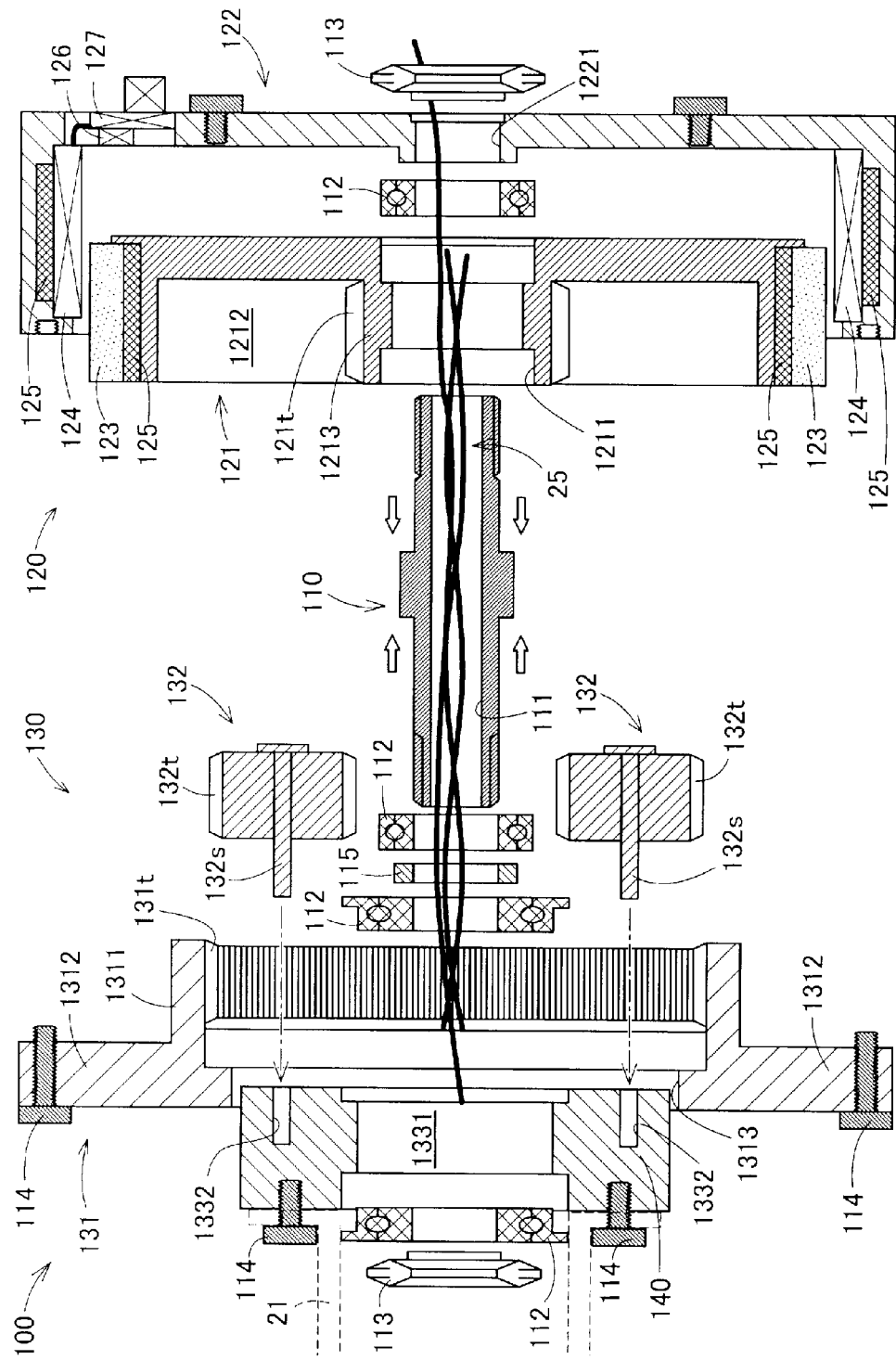
FIG. 4 is a schematic exploded sectional view showing an internal structure of the power generating apparatus of the first embodiment.

FIG. 3 is a schematic sectional view showing an internal structure of the power generating apparatus 100, and FIG. 4 is a schematic exploded sectional view showing the components of the power generating apparatus 100. Incidentally, in FIGS. 3 and 4, the rotating shaft of the first bevel gear 21, the rotating shaft connected to the power generating apparatus 100, is indicated by dashed lines. The power generating apparatus 100 includes a central shaft 110, a motor section 120, and a rotation mechanism section 130.

The motor section 120 and the rotation mechanism section 130 are disposed in such a way that they are integrated together as a result of one being fitted into the other as will be described later, and the central shaft 110 is disposed so as to pass through the center of the motor section 120 and the rotation mechanism section 130 which are integrated together. The central shaft 110 has a through hole 111 extending in the axial direction, and the conductive line bundle 25 is placed through the through hole 111.

The motor section 120 includes a rotor 121 and a casing 122. A main body section of the rotor 121 has a virtually disk-like shape, and, on an outer periphery of the side wall of the main body section, a permanent magnet 123 is disposed. Incidentally, on a back surface (a side wall's-side surface of the rotor 121) of the permanent magnet 123, a back yoke 125 for improving magnetic force efficiency is disposed.

The rotor 121 has, in the center thereof, a through hole 1211 through which the central shaft 110 is placed. Incidentally, between an inner wall surface of the through hole 1211 and an outer periphery of the central shaft 110, bearing sections 112 for making the rotor 121 rotatable about the central shaft 110 are disposed. The bearing section 112 can be formed of a ball bearing, for example.

In a face of the rotor 121 facing the rotation mechanism section 130, a concave section 1212 formed as a groove having a virtually circular ring shape, the groove having the through hole 1211 in the center thereof, is provided. On an outer wall surface of a partition wall 1213 which is roughly cylindrical in shape and separates the through hole 1211 and the concave section 1212, gear teeth 121*t* are formed. Hereinafter, the partition wall 1213 having the gear teeth 121*t*, the partition wall 1213 provided in the center of the rotor 121, is called the "rotor gear 1213". As will be described later, the rotor gear 1213 in this embodiment functions as a sun gear of a planet gear.

The casing 122 is a hollow body which is roughly cylindrical in shape, the hollow body having an opening in a face facing the rotation mechanism section 130, and houses the rotor 121. The casing 122 may be formed of resin material such as carbon fiber reinforced plastics (CFRP). This makes it possible to make the power generating apparatus 100 lighter.

In the center of the bottom face of the casing 122, a through hole 1221 through which the central shaft 110 is placed is formed. The central shaft 110 and the casing 122 are attached in such a way that they are fixed to each other. Incidentally, on the outside of the casing 122, a bearing ring 113 for holding the central shaft 110 more tightly is attached so as to be fitted thereinto.

On an inner periphery of the casing 122, an electromagnet 124 is disposed so as to face the permanent magnet 123 of the rotor 121 with a space between the electromagnet 124 and the permanent magnet 123. That is, in the motor section 120, the electromagnet 124 functions as a stator and rotates the rotor 121 about the central shaft 110. Incidentally, between the electromagnet 124 and the casing 122, a back yoke 125 for improving magnetic force efficiency is disposed.

In the bottom face of the casing 122, a position detecting section 126 detecting the position of the permanent magnet 123 and a rotation control circuit 127 for controlling the rotation of the rotor 121 are provided. The position detecting section 126 is formed of a Hall device, for example, and is disposed so as to correspond to the position of the permanent magnet 123 in orbit. The position detecting section 126 is connected to the rotation control circuit 127 via a signal line.

To the rotation control circuit 127, a conductive line branched off from the conductive line bundle 25 is connected. Moreover, the rotation control circuit 127 is electrically connected to the electromagnet 124. The rotation control circuit 127 transmits a detected signal output from the position detecting section 126 to a control section (not shown) controlling the driving of the power generating apparatus 100. Furthermore, the rotation control circuit 127 makes the electromagnet 124 generate a magnetic field by supplying electric power thereto according to a control signal from the control section, and thereby rotating the rotor 121.

Together with the rotor gear 1213 of the rotor 121, the rotation mechanism section 130 forms the planet gear, and functions as a speed reducer. The rotation mechanism section 130 includes a gear fixing section 131, three planetary gears 132, and a load connection section 133. Incidentally, in FIGS. 3 and 4, for the sake of convenience, only two planetary gears 132 are shown.

The gear fixing section 131 has an outer gear 1311 which is a nearly annular gear with an inner wall surface in which gear teeth 131*t* are provided and a flange section 1312 jutting from the periphery of the outer gear 1311. The gear fixing section 131 is fixedly attached to the motor section 120 by fastening the flange section 1312 to an end face of the side wall of the casing 122 of the motor section 120 with fixing bolts 114.

The outer gear 1311 of the gear fixing section 131 is housed in the concave section 1212 of the rotor 121. Moreover, between an inner periphery of the outer gear 1311 and an outer periphery of the rotor gear 1213, the three planetary gears 132 are disposed at almost regular intervals along the periphery of the rotor gear 1213. Incidentally, these three types of gears 1213, 132, and 1311 are connected as a result of the engagement of gear teeth 132*t* of the planetary gears 132, the gear teeth 131*t* of the outer gear 1311, and the gear teeth 121*t* of the rotor gear 1213.

The load connection section 133 is a member which is roughly cylindrical in shape and functions as a planetary carrier. In the center of the bottom face of the load connection section 133, a through hole 1331 placed through the central shaft 110 is provided. Between an inner wall surface of the through hole 1331 and the outer periphery of the central shaft 110, bearing sections 112 for making the load connection section 133 rotatable about the central shaft 110 are disposed. Incidentally, between the bearing section 112 attached to the load connection section 133 and the bearing section 112 attached to the rotor 121, a spacer 115 is disposed.

Here, in a central part of the gear fixing section 131, a nearly circular opening 1313 communicating with an inner space of the outer gear 1311 is formed, and the load connection section 133 is disposed in the opening 1313. In the bottom face of the load connection section 133, the bottom face facing the motor section 120 (the right side of the drawing in FIGS. 3 and 4), shaft holes 1332 for rotatably holding rotating shafts 132*s* of the planetary gears 132 housed in the concave section 1212 of the rotor 121 are formed.

In the bottom face of the load connection section 133, the bottom face facing the outside (the left side of the drawing in FIGS. 3 and 4), the bearing ring 113 for holding the central shaft 110 more tightly is attached so as to be fitted thereinto. To the bottom face of the load connection section 133, the bottom face facing the outside, the rotating shaft of the first bevel gear 21 is also fixed with the fixing bolts 114.

Figure 5:
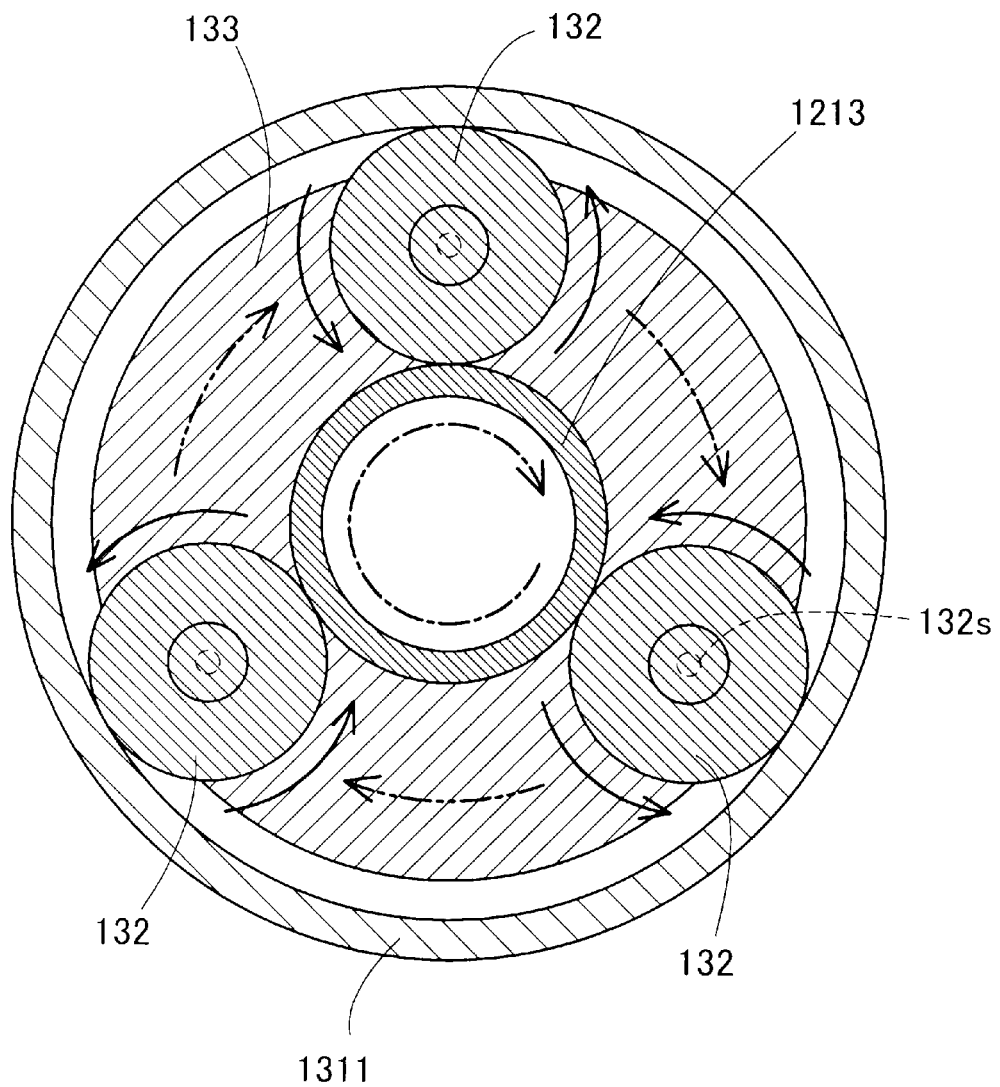
FIG. 5 is a schematic diagram for explaining a mechanism by which a rotational driving force is transferred in the power generating apparatus of the first embodiment.

FIG. 5 is a schematic diagram for explaining a mechanism by which a rotational driving force is transferred in the power generating apparatus 100. In FIG. 5, the rotor gear 1213, the three planetary gears 132, the outer gear 1311, and the load connection section 133 when the power generating apparatus 100 is seen along the axial direction of the central shaft 110 are schematically shown. Incidentally, in FIG. 5, for the sake of convenience, the gear teeth of each gear are not shown.

Here, assume that, in the power generating apparatus 100, the rotor gear 1213 which is a sun gear rotates in a direction shown by an arrow indicated by an alternate long and short dashed line with the rotation of the rotor 121. As described earlier, since the outer gear 1311 is fixedly disposed, with the rotation of the rotor gear 1213, each planetary gear 132 orbits around the rotor gear 1213 in a direction shown by arrows indicated by chain double-dashed lines while rotating about the rotating shaft 132s thereof in a direction shown by arrows indicated by solid lines. With the orbiting movement of each planetary gear 132, the load connection section 133 rotates and the first bevel gear 21 (FIG. 1B) connected to the load connection section 133 rotates.

Incidentally, in a commonly-used motor, to improve the responsiveness of the motor, it is preferable to improve the inertial characteristics by reducing the diameter of the rotor and reducing the inertia (motor inertia) thereof. On the other hand, in the motor section 120 of this embodiment, the diameter of the rotor 121 is made larger to the extent that the rotation mechanism section 130 can be housed, and therefore the motor inertia is increased. However, the inventor of the invention has found that, even when the diameter of the rotor 121 is made larger and the motor inertia is increased as in this embodiment, a reduction in transient responsiveness of the power generating apparatus 100 to control is suppressed. The reason is as follows.

That is, in the power generating apparatus 100 of this embodiment, the torque produced in the motor section 120 is increased as the diameter of the rotor 121 is made larger, and the torque transferred to the rotation mechanism section 130 when rotation of the rotor 121 is started and the direction of rotation is switched. Therefore, in the power generating apparatus 100, it is possible to make the rotation mechanism section 130 quickly follow a change in the rotation of the motor section 120, whereby a reduction in transient responsiveness of the power generating apparatus 100 is suppressed. That is, in the power generating apparatus 100, a reduction in the inertial characteristics in the motor section 120 is compensated for by an improvement of the torque characteristics obtained by making the diameter of the rotor 121 larger.

As described above, in the power generating apparatus 100 of this embodiment, the sun gear is integrally provided in the rotor 121, and the planetary gears 132 and the outer gear 1311 are housed in the concave section 1212 provided in the rotor 121. That is, the power generating apparatus 100 has a structure in which a motor and a planet gear which is a speed reducer are compactly integrated together. By using the power generating apparatus 100, it is possible to make the robotic arm 10 smaller and lighter.

Moreover, in the power generating apparatus 100, the conductive line bundle 25 for controlling the rotation driving of the rotor 121 is placed through the central shaft 110. Therefore, by using the power generating apparatus 100, the conductive line bundle 25 can be laid more easily. Furthermore, it is possible to prevent the conductive line bundle 25 from being exposed to the outside, reduce deterioration of the conductive line bundle 25 caused by the driving of the robotic arm 10, and improve the design of the robotic arm 10.

B. Other Structural Examples of First Embodiment

Figure 6:
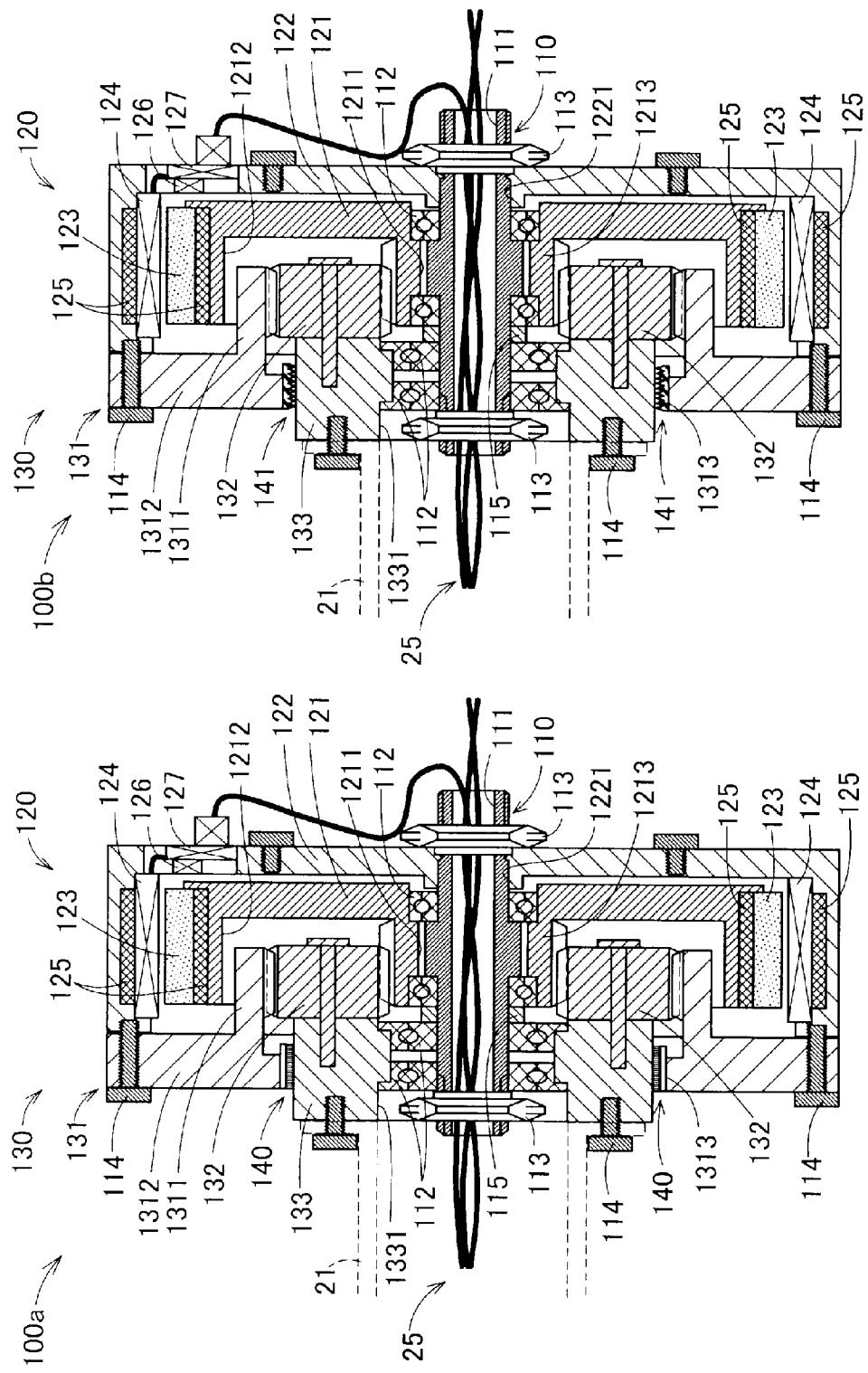
FIGS. 6A and 6B are schematic diagrams showing the structure of the power generating apparatus as another structural example of the first embodiment.

FIG. 6A is a schematic diagram showing the structure of a power generating apparatus 100a as another structural example of this embodiment. FIG. 6A is almost the same as FIG. 3 except that a brush seal section 140 is provided. The brush seal section 140 is provided between a side face of the load connection section 133 and an inner periphery of the opening 1313 of the gear fixing section 131, and prevents the entry of dust into the power generating apparatus 100. This reduces deterioration of the power generating apparatus 100.

FIG. 6B is a schematic diagram showing the structure of a power generating apparatus 100b as another structural example of this embodiment. FIG. 6B is almost the same as FIG. 6A except that a rubber seal section 141 is provided in place of the brush seal section 140. The rubber seal section 141 is provided between the side face of the load connection section 133 and the inner periphery of the opening 1313 of the gear fixing section 131, and hermitically seals the power generating apparatus 100. This makes it possible to reduce rotation loss of the gear and the rotor caused by a current of air in the power generating apparatus 100.

Figure 7:
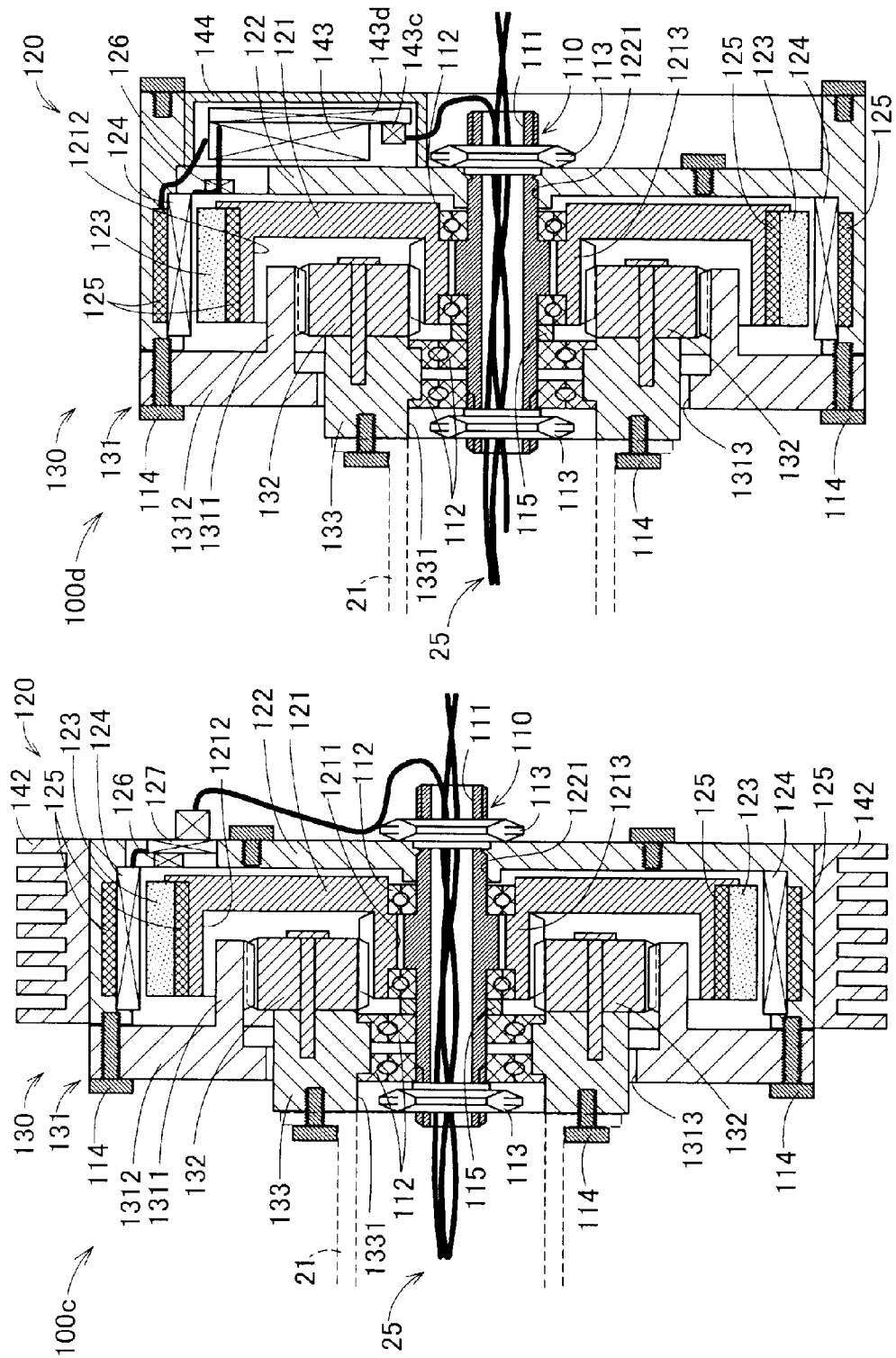
FIGS. 7A and 7B are schematic diagrams showing the structure of the power generating apparatus as another structural example of the first embodiment.

FIG. 7A is a schematic diagram showing the structure of a power generating apparatus 100c as another structural example of this embodiment. FIG. 7A is almost the same as FIG. 3 except that a heat exchange fin 142 is provided. The heat exchange fin 142 is provided on an outer surface of the casing 122 of the motor section 120. This makes it possible to release heat efficiently, the heat generated by a coil current in the electromagnet 124, and increase the output torque of the motor section 120. Incidentally, the heat exchange fin 142 and the back yoke 125 for the electromagnet 124 may be disposed in such a way as to have direct contact with each other. This makes it possible to dissipate heat generated by the electromagnet 124 more efficiently. In place of the heat exchange fin 142, a refrigerant jacket may be attached to the periphery of the casing 122.

FIG. 7B is a schematic diagram showing the structure of a power generating apparatus 100d as another structural example of this embodiment. FIG. 7B is almost the same as FIG. 3 except that, in place of the rotation control circuit 127, a control section 143, a communication section 143c, and a driver circuit 143d are provided in a casing 144. The control section 143 is formed of a microcomputer having a central processing unit and main memory, and controls the communication section 143c and the driver circuit 143d. The communication section 143c performs communication of commands with the outside. The driver circuit 143d controls a current which is passed through the electromagnet 124 according to an instruction from the control section 143. That is, in this structural example, the control section 143, the communication section 143c, and the driver circuit 143d which are integrally provided in the power generating apparatus 100d make it possible to drive the power generating apparatus 100d according to a command transmitted from the outside.

Figure 8:
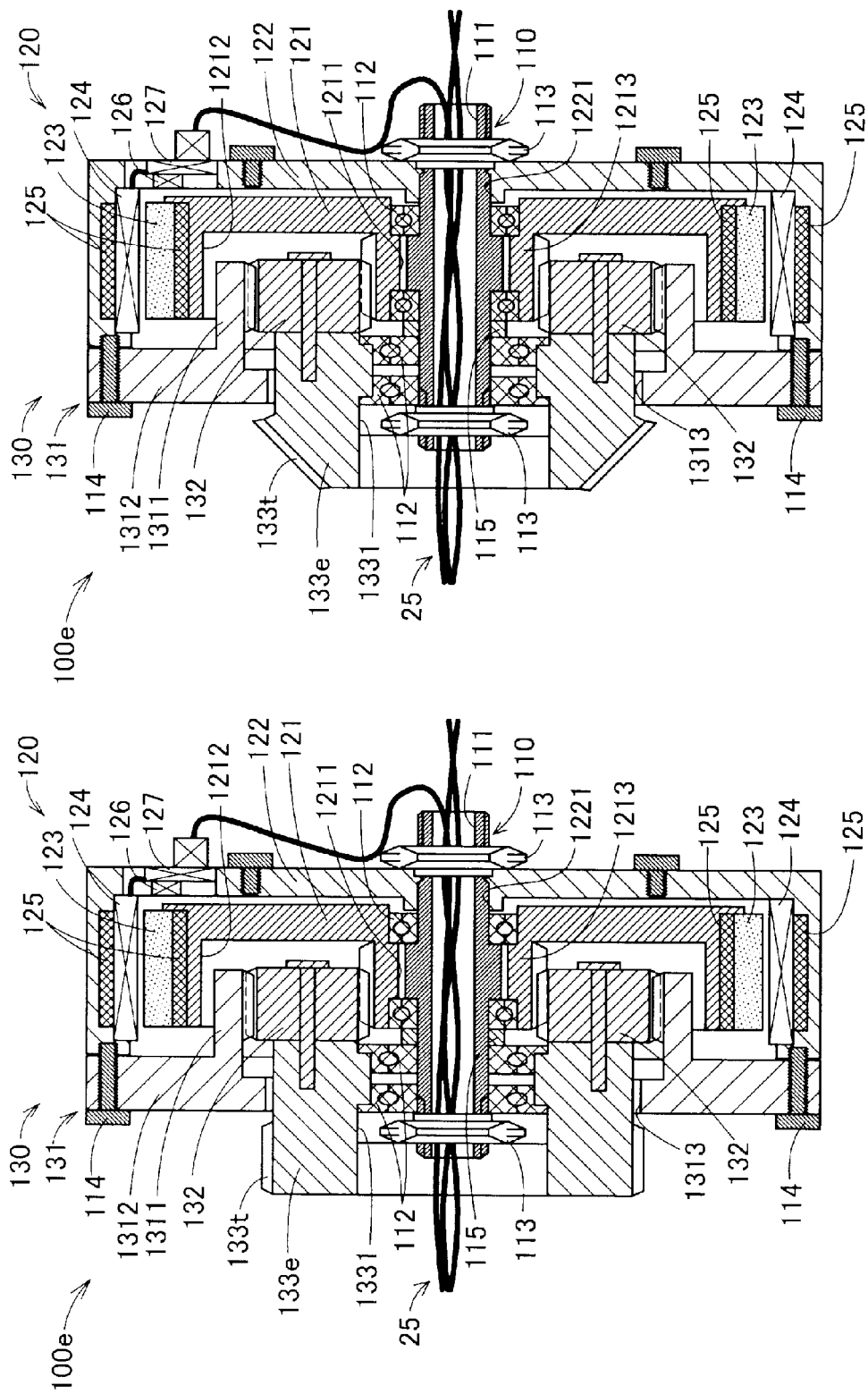
FIGS. 8A and 8B are schematic diagrams showing the structure of the power generating apparatus as another structural example of the first embodiment.

FIGS. 8A and 8B are schematic diagrams showing the structure of a power generating apparatus 100e as another structural example of this embodiment. FIGS. 8A and 8B are almost the same as FIG. 3 except that, in place of the load connection section 133, a load connection section 133e is provided and dashed lines indicating the rotating shaft of the first bevel gear 21 are omitted. Unlike the power generating apparatus 100 of the first embodiment, the power generating apparatus 100e in the structural examples of FIGS. 8A and 8B is used in an actuator and a manipulator which have a structure different from that of the robotic arm 10.

In the structural example shown in FIG. 8A, the load connection section 133e is structured in the same manner as the load connection section 133 (FIG. 3) of the first embodiment except that the load connection section 133e is formed integrally with a spur gear having gear teeth 133t on a side wall surface projecting from the gear fixing section 131. That is, in this structural example, the load connection section 133e functions as a planetary carrier and also functions as a gear transferring a rotational driving force to an external load.

The structural example shown in FIG. 8B is the same as the structural example of FIG. 8A except that the load connection section 133e is formed integrally with a bevel gear. As described above, the load connection section 133e can be formed integrally with various types of gears.

C. Second Embodiment

Figure 9:
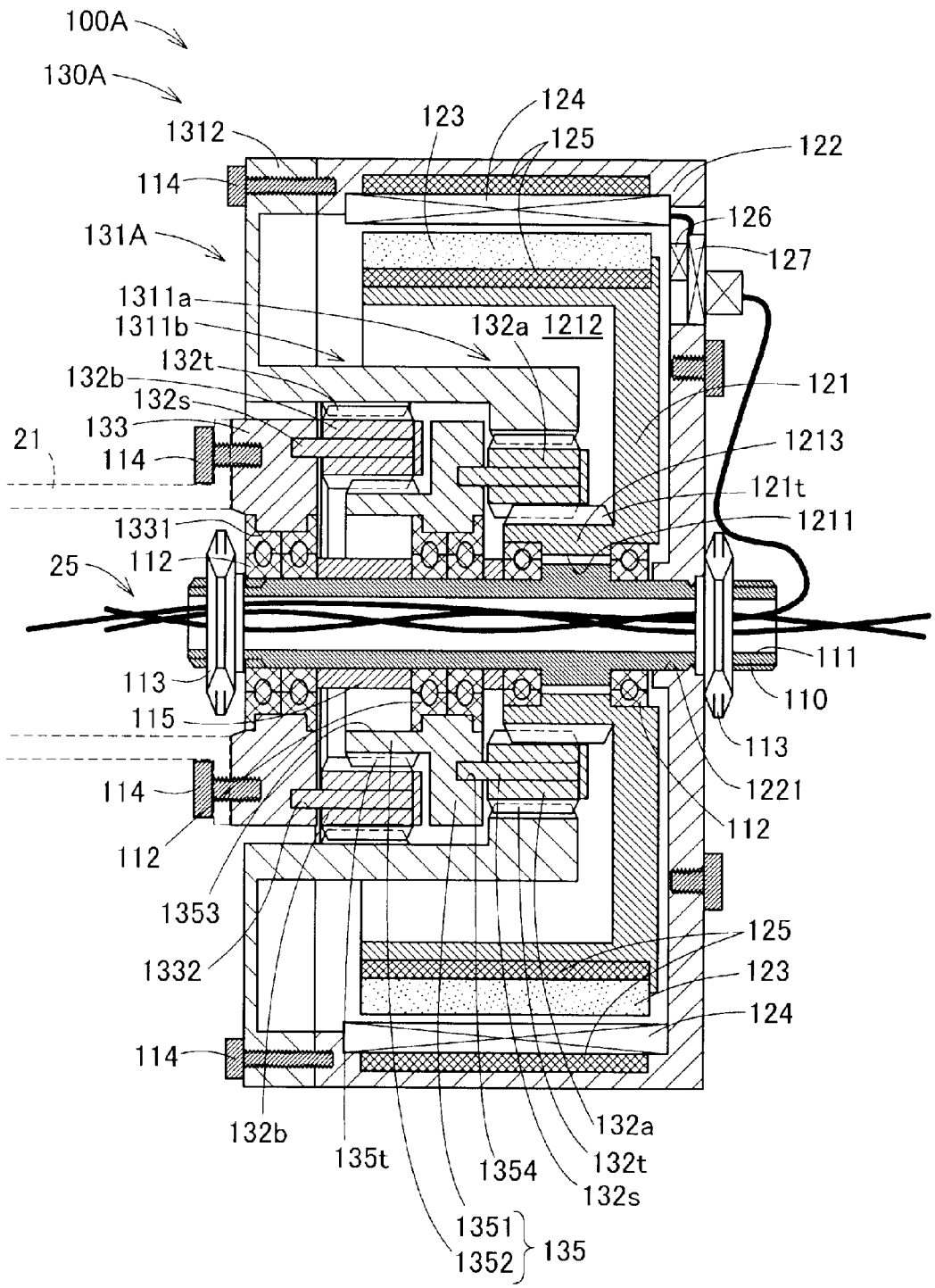
FIG. 9 is a schematic sectional view showing an internal structure of the power generating apparatus of a second embodiment.
Figure 10:
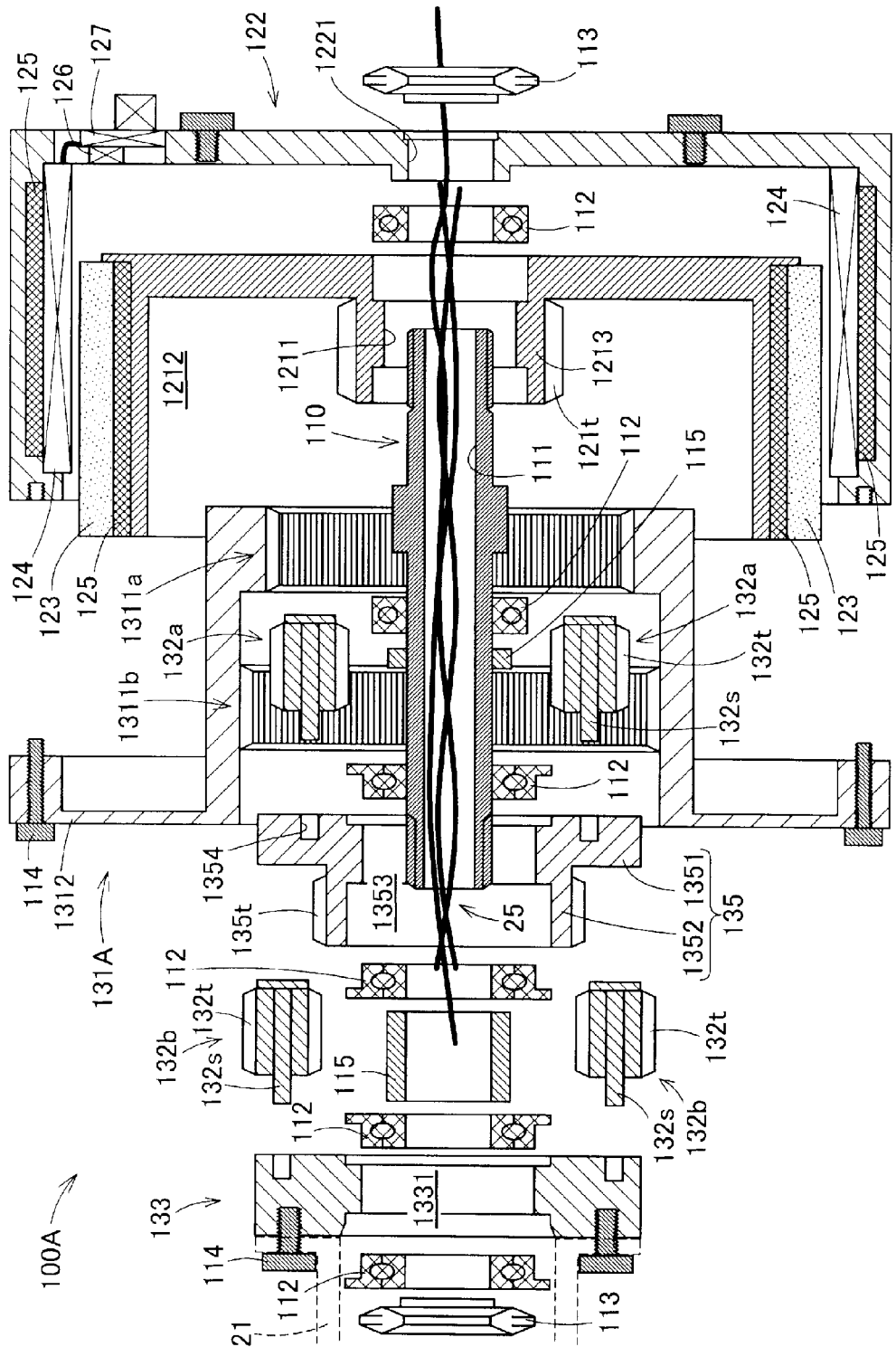
FIG. 10 is a schematic exploded sectional view showing an internal structure of the power generating apparatus of the second embodiment.

FIGS. 9 and 10 are schematic diagrams showing the structure of a power generating apparatus 100A as a second embodiment of the invention. FIG. 9 is a schematic sectional view showing an internal structure of the power generating apparatus 100A, and FIG. 10 is a schematic exploded sectional view showing the components of the power generating apparatus 100A. The power generating apparatus 100A has a structure in which a speed reducer formed of two stacked planet gears and a motor are integrated together, and differs from the power generating apparatus 100 (FIGS. 3 and 4) of the first embodiment in the following respect.

The power generating apparatus 100A of the second embodiment has a rotation mechanism section 130A. In a gear fixing section 131A of the rotation mechanism section 130A, first and second outer gears 1311a and 1311b are provided in such a way that they are stacked in parallel to the axial direction of the central shaft 110. Both the first and second outer gears 1311a and 1311b are housed in the concave section 1212 of the rotor 121 when the gear fixing section 131A is fixedly attached to the casing 122.

The first outer gear 1311a is connected to the rotor gear 1213 via first planetary gears 132a. That is, the rotor gear 1213 functions as a sun gear in a first-stage planet gear. The first planetary gears 132a are rotatably attached to a planetary carrier 135.

The planetary carrier 135 is a rotating member formed of a cylindrical front part 1351 having a relatively large diameter and a cylindrical back part 1352 having a relatively small diameter, the front part 1351 and the back part 1352 connected together. The front part 1351 of the planetary carrier 135 is disposed between the first and second outer gears 1311a and 1311b, and, in the bottom face thereof, shaft holes 1354 for holding the rotating shafts 132s of the first planetary gears 132a are provided. The back part 1352 has gear teeth 135t formed on a side wall surface thereof and is disposed in an inner space of the second outer gear 1311b.

Incidentally, in a central part of the planetary carrier 135, a through hole 1353 through which the central shaft 110 is placed is provided so as to pass through both the front part 1351 and the back part 1352. Between the through hole 1353 and the central shaft 110, the bearing sections 112 for making the planetary carrier 135 rotatable are disposed. Incidentally, between the bearing sections 112, the spacer 115 is appropriately disposed.

Between the back part 1352 of the planetary carrier 135 and the second outer gear 1311b, second planetary gears 132b are disposed. That is, the back part 1352 functions as a sun gear in a second-stage planet gear. The second planetary gears 132b are rotatably attached to the load connection section 133 functioning as a planetary carrier.

Figure 11A:
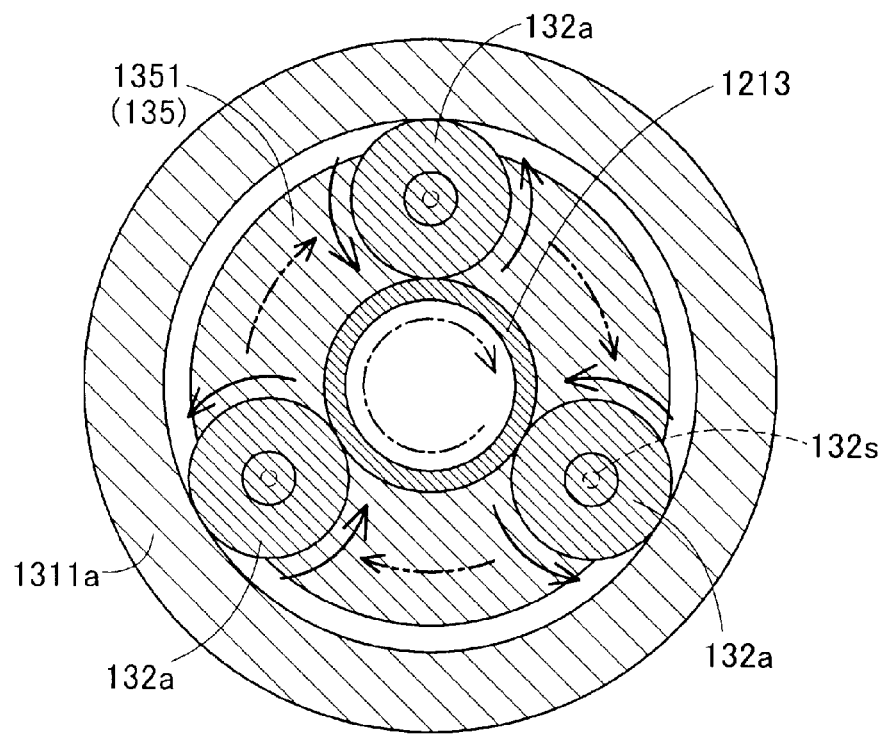
FIGS. 11A and 11B are schematic diagrams for explaining a mechanism by which a rotational driving force is transferred in a two-stage planet gear of the power generating apparatus of the second embodiment.
Figure 11B:
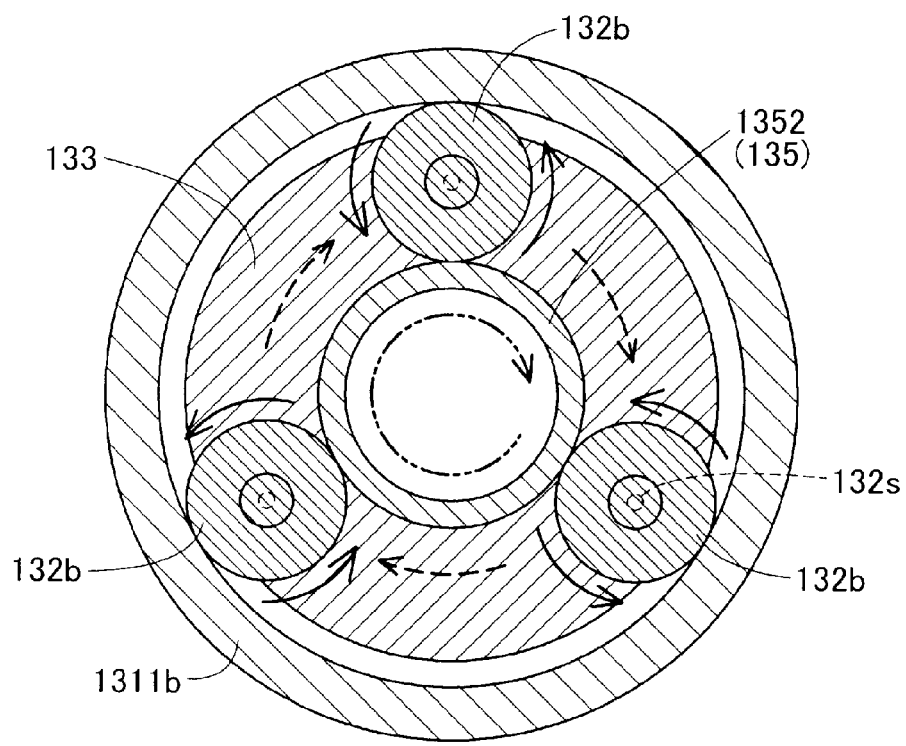

FIGS. 11A and 11B are schematic diagrams which are similar to that of FIG. 5, the schematic diagrams for explaining a mechanism by which a rotational driving force is transferred in the two-stage planet gear of the power generating apparatus 100A. In FIG. 11A, the first-stage planet gear formed of the rotor gear 1213, the first planetary gears 132a, the first outer gear 1311a, and the front part 1351 of the planetary carrier 135 is shown. In the first-stage planet gear, with the rotation of the rotor gear 1213, the first planetary gears 132a orbit the periphery of the rotor gear 1213 while rotating about the rotating shafts 132s thereof, and the front part 1351 of the planetary carrier 135 rotates with the orbiting movement of the first planetary gears 132a.

Incidentally, in FIG. 11A, the direction of rotation of the rotor gear 1213 is shown by an arrow indicated by an alternate long and short dashed line, and the direction of rotation of the first planetary gears 132a is shown by arrows indicated by solid lines. Moreover, the direction of orbiting movement of the first planetary gears 132a, that is, the direction of rotation of the planetary carrier 135 is shown by arrows indicated by chain double-dashed lines.

In FIG. 11B, the second-stage planet gear formed of the back part 1352 of the planetary carrier 135, the second planetary gears 132b, the second outer gear 1311b, and the load connection section 133 is shown. In the second-stage planet gear, with the rotation of the back part 1352 of the planetary carrier 135, the second planetary gears 132b orbit the periphery of the back part 1352 of the planetary carrier 135 while rotating about the rotating shafts 132s thereof. With the orbiting movement of the second planetary gears 132b, the load connection section 133 rotates, and a rotational driving force is transferred to an external load connected to the load connection section 133.

Incidentally, in FIG. 11B, the direction of rotation of the back part 1352 of the planetary carrier 135 is shown by an arrow indicated by a chain double-dashed line, and the direction of rotation of the second planetary gears 132b is shown by arrows indicated by solid lines. Moreover, the direction of orbiting movement of the second planetary gears 132b, that is, the direction of rotation of the load connection section 133 is shown by arrows indicated by dashed lines.

As described above, the power generating apparatus 100A of the second embodiment is made smaller by housing the two-stage planet gear in the concave section 1212 of the rotor 121 as a speed reducer that can output a rotational driving force having higher torque. By applying the power generating apparatus 100A to the robotic arm 10 (FIGS. 1A and 1B), it is possible to make the first to third joint sections J1 to J3 turn with higher torque than that in the first embodiment. Incidentally, in the power generating apparatus 100A, a planet gear formed of three or more stages may be formed.

D. Third Embodiment

Figure 12:
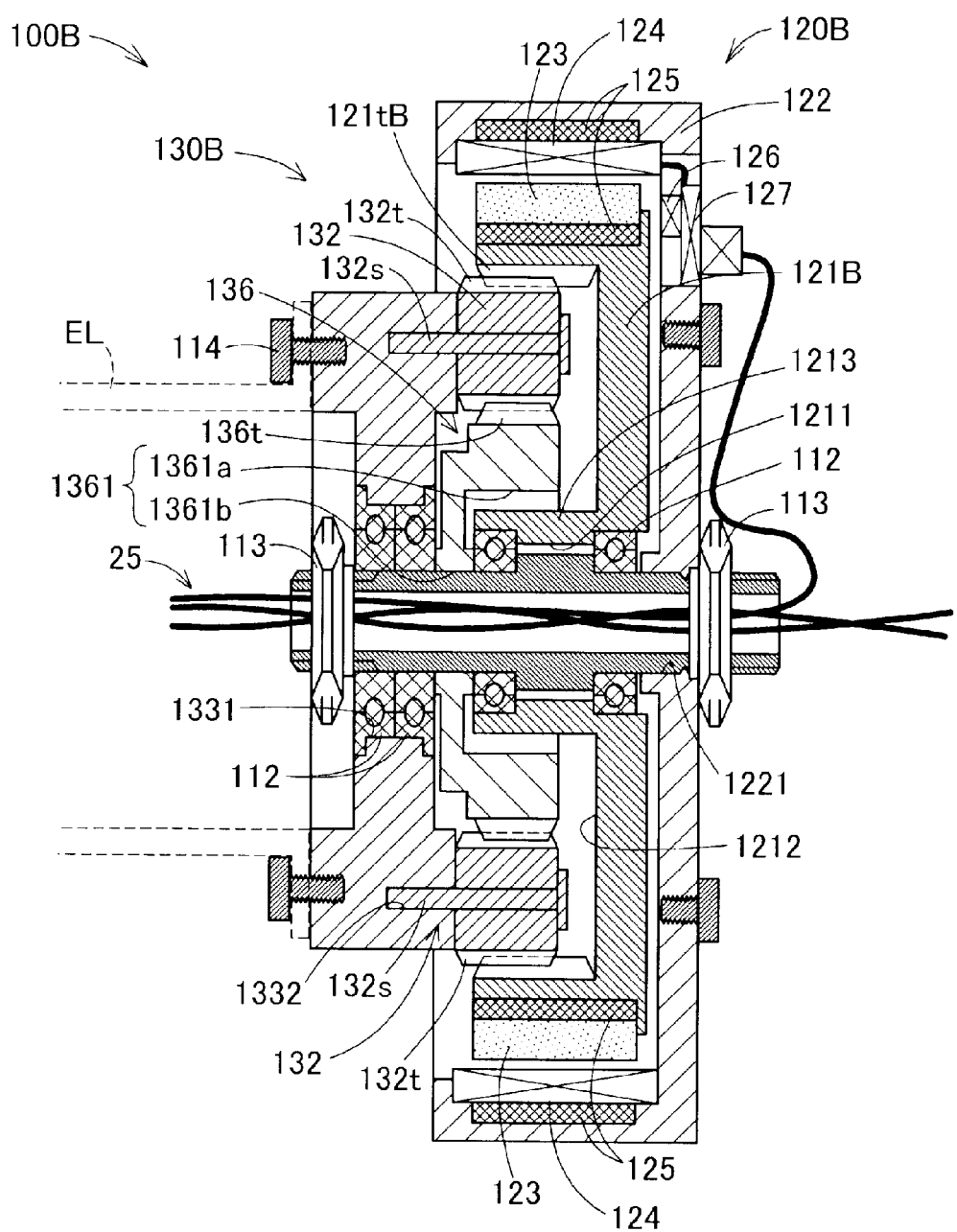
FIG. 12 is a schematic sectional view showing an internal structure of the power generating apparatus of a third embodiment.
Figure 13:
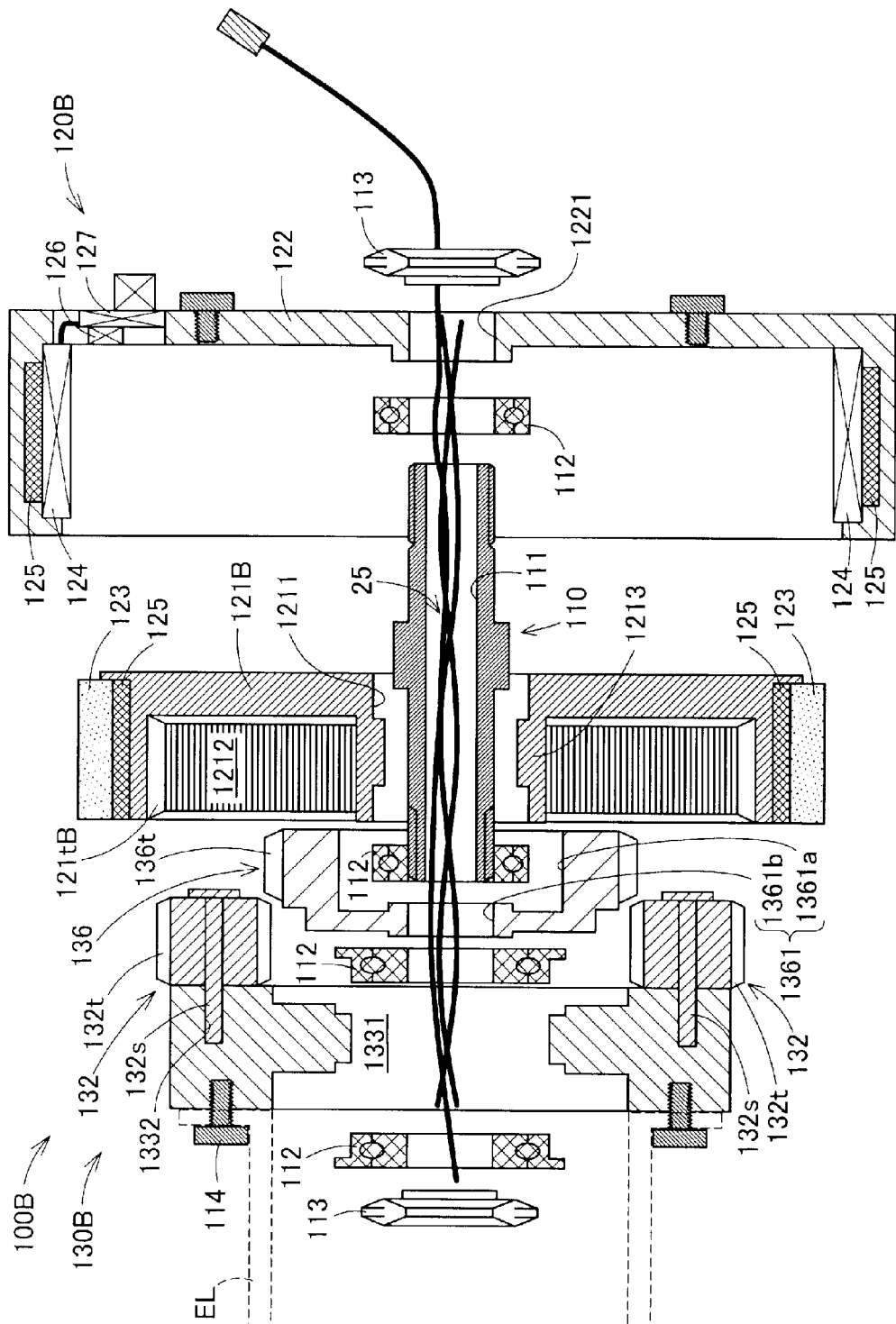
FIG. 13 is a schematic exploded sectional view showing an internal structure of the power generating apparatus of the third embodiment.

FIGS. 12 and 13 are schematic diagrams showing the structure of a power generating apparatus 100B as a third embodiment of the invention. FIG. 12 is a schematic sectional view showing an internal structure of the power generating apparatus 100B, and FIG. 13 is a schematic exploded sectional view showing the components of the power generating apparatus 100B. The power generating apparatus 100B has a structure in which a planet gear functioning as a speed-increasing gear and a motor are integrated together and transfers a rotational driving force to an external load EL. The power generating apparatus 100B differs from the power generating apparatus 100 (FIGS. 3 and 4) of the first embodiment in the following respect.

A motor section 120B of the third embodiment includes a rotor 121B. The rotor 121B has the same structure as the rotor 121 described in the first embodiment except that the gear teeth 121t on the outer surface of the partition wall 1213 provided in the center are omitted and gear teeth 121tB are provided on an inner periphery of a side wall of the rotor 121B. In the power generating apparatus 100B of the third embodiment, the rotor 121B functions as an outer gear.

A rotation mechanism section 130B of the power generating apparatus 100B includes a sun gear 136. The sun gear 136 is a member which is roughly cylindrical in shape and has, in the center thereof, a through hole 1361 through which the central shaft 110 is placed, and has gear teeth 136t on a side wall surface. The through hole 1361 has a front part 1361a that can house the partition wall 1213 in the center of the rotor 121B with a gap left and a back part 1361b fixedly connected to the central shaft 110.

The planetary gear 132 is disposed in the concave section 1212 of the rotor 121B and connects the sun gear 136 and the rotor 121B which is an outer gear. The planetary gear 132 is rotatably attached to the load connection section 133 functioning as a planetary carrier. To the load connection section 133, a rotating shaft (indicated by dashed lines) of the external load EL is attached with the fixing bolts 114.

Figure 14:
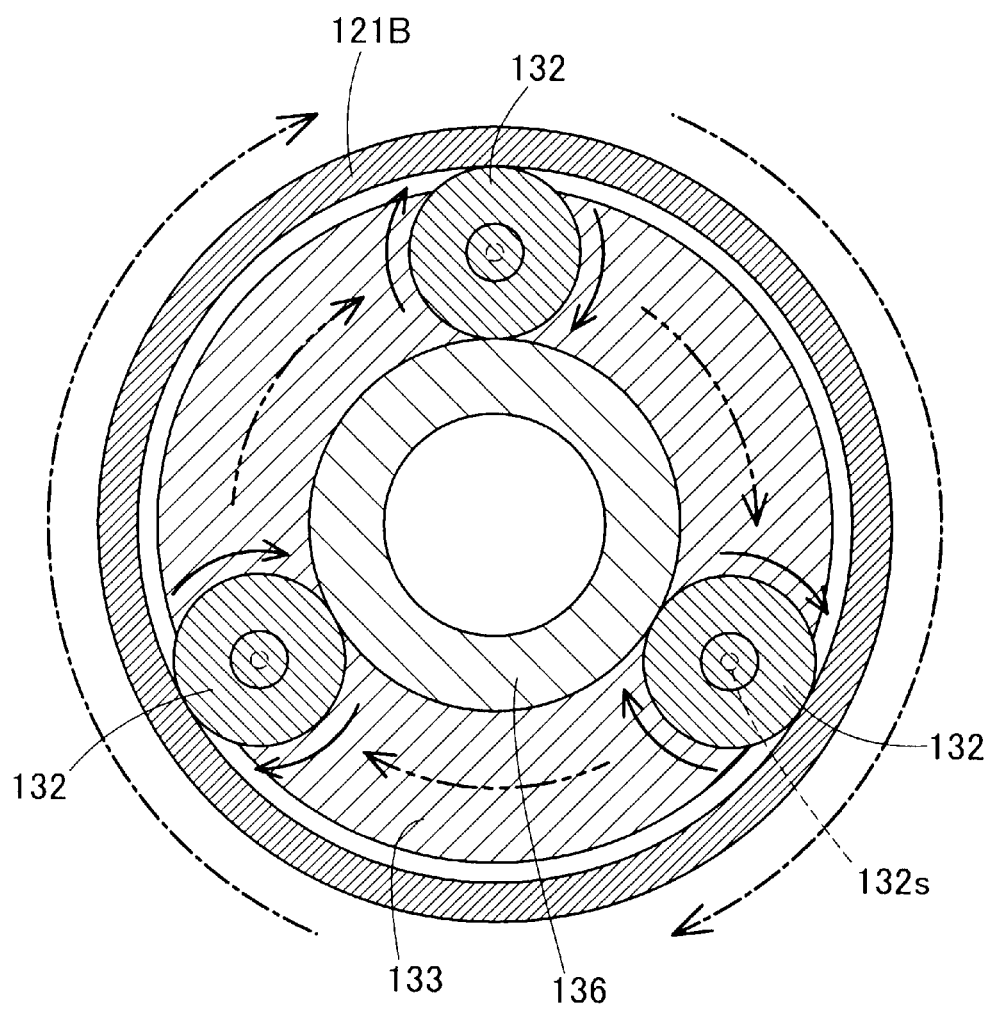
FIG. 14 is a schematic diagram for explaining a mechanism by which a rotational driving force is transferred in the power generating apparatus of the third embodiment.

FIG. 14 is a schematic diagram which is similar to those of FIGS. 11A and 11B, the schematic diagram for explaining a mechanism by which a rotational driving force is transferred in the power generating apparatus 100B. Since the sun gear 136 is fixed to the central shaft 110, with the rotation of the rotor 121B which is the outer gear, the planetary gears 132 orbit the periphery of the sun gear 136 while rotating about the rotating shafts 132s thereof. With the orbiting movement of the planetary gears 132, the load connection section 133 which is the planetary carrier rotates.

Incidentally, in FIG. 14, the direction of rotation of the rotor 121B is shown by arrows indicated by alternate long and short dashed lines, and the direction of rotation of the planetary gears 132 is shown by arrows indicated by solid lines. Moreover, in FIG. 14, the direction of orbiting movement of the planetary gears 132, that is, the direction of rotation of the load connection section 133 is shown by arrows indicated by chain double-dashed lines.

As described above, the power generating apparatus 100B of the third embodiment is made smaller as a result of the planet gear functioning as the speed-increasing gear being housed in the concave section 1212 of the rotor 121B of the motor section 120. Therefore, by using the power generating apparatus 100B, it is possible to make an actuator and a manipulator which require a high-speed rotational driving force more compact.

E. Fourth Embodiment

Figure 15:
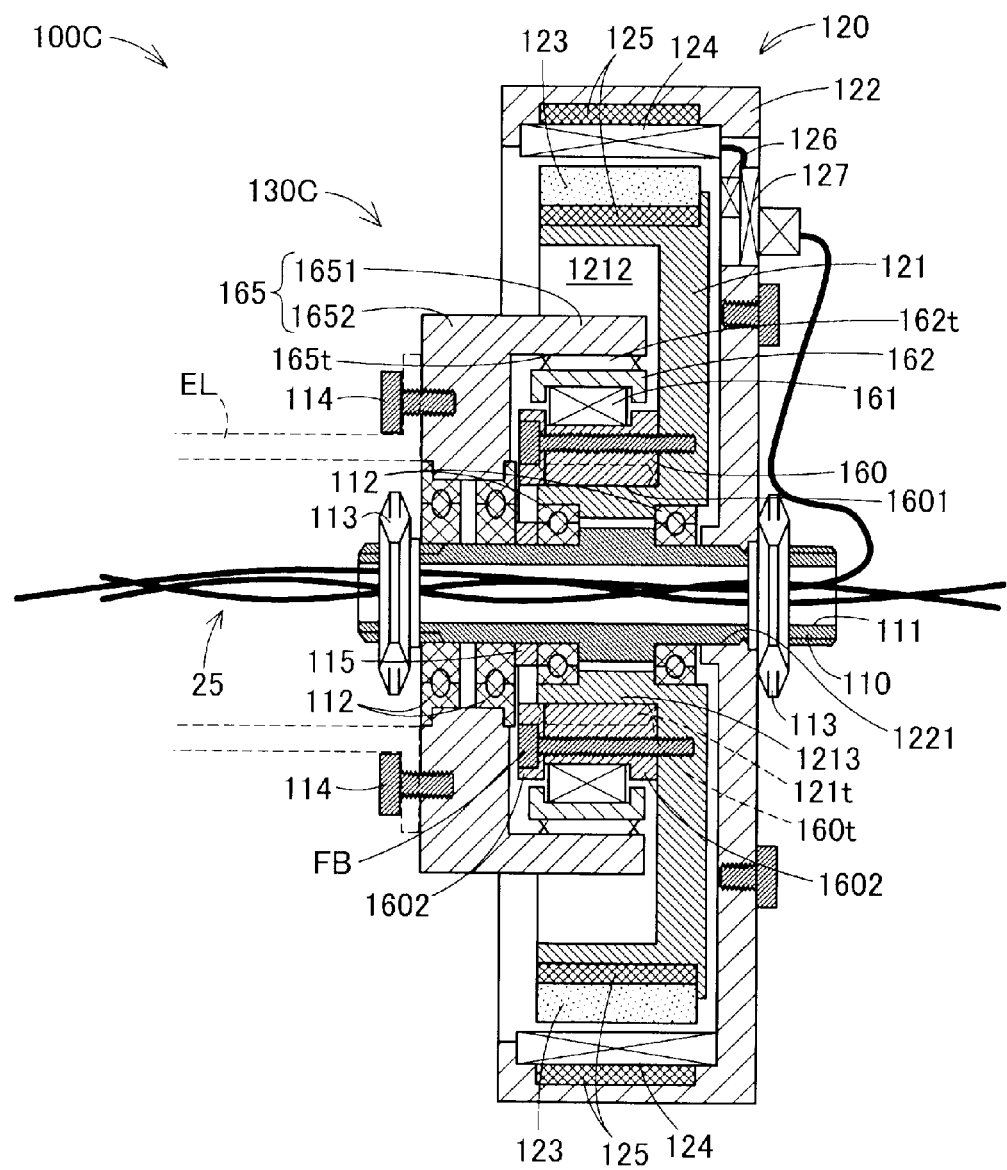
FIG. 15 is a schematic sectional view showing an internal structure of the power generating apparatus of a fourth embodiment.
Figure 16:
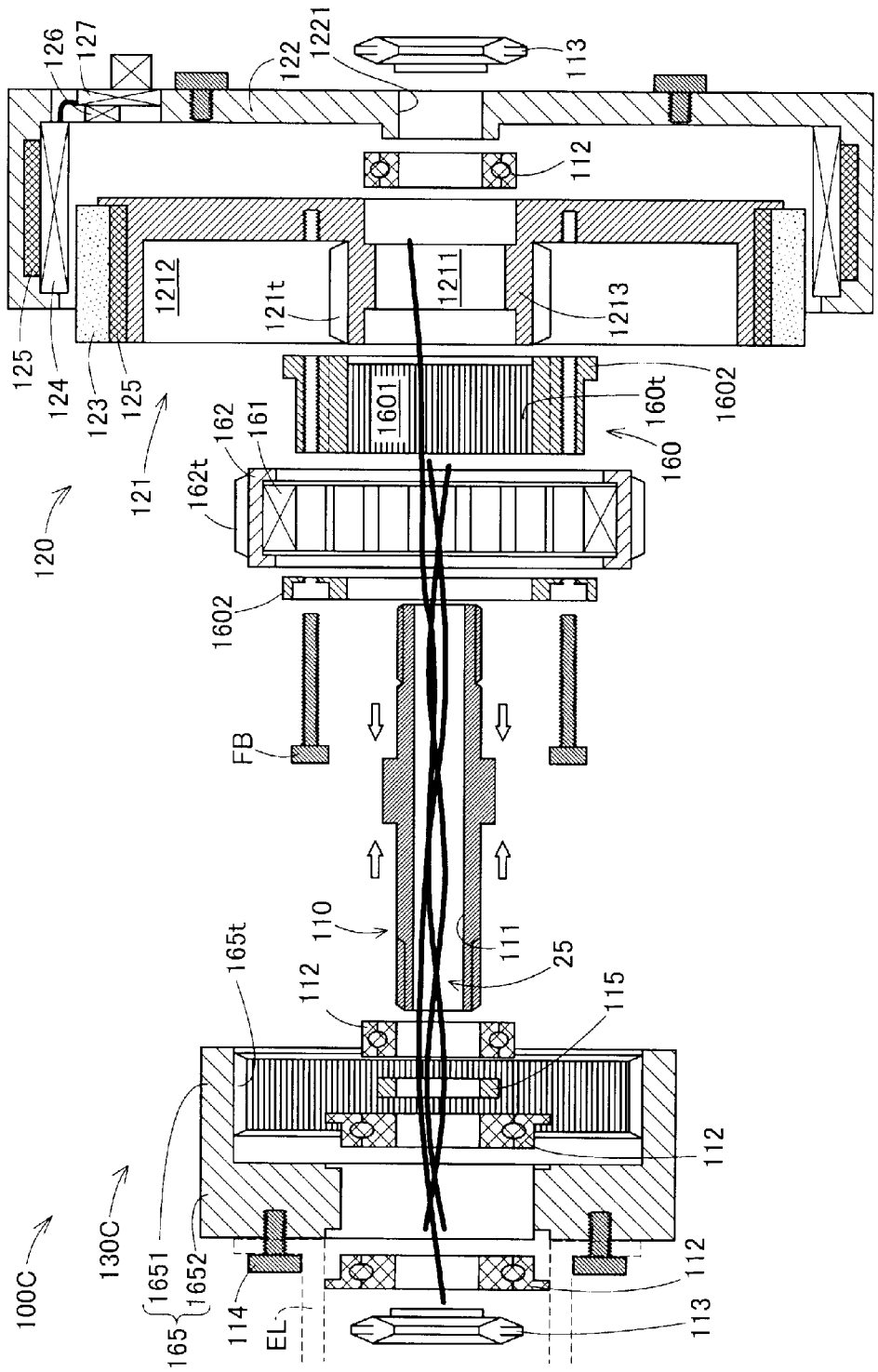
FIG. 16 is a schematic exploded sectional view showing an internal structure of the power generating apparatus of the fourth embodiment.

FIGS. 15 and 16 are schematic diagrams showing the structure of a power generating apparatus 100C as a fourth embodiment of the invention. FIG. 15 is a schematic sectional view showing an internal structure of the power generating apparatus 100C, and FIG. 16 is a schematic exploded sectional view showing the components of the power generating apparatus 100C. The power generating apparatus 100C has a structure in which a harmonic drive mechanism and a motor are integrated together and transfers a rotational driving force to an external load EL. The power generating apparatus 100C differs from the power generating apparatus 100 (FIGS. 3 and 4) of the first embodiment in the following respect.

In the power generating apparatus 100C, as a rotation mechanism section 130C, a wave generator 160, a flexible spline 162, and a circular spline 165 which form the harmonic drive mechanism are housed in the concave section 1212 of the rotor 121. The wave generator 160 is a member which is roughly elliptic cylindrical in shape and has a bottom face which is roughly elliptical in shape.

In the wave generator 160, a through hole 1601 which passes through the wave generator 160 in a direction of a central shaft thereof (a horizontal direction in the drawing) is provided, and on an inner wall surface of the through hole 1601, gear teeth 160t are formed. The wave generator 160 is fastened to the rotor 121 with fastening bolts FB in a state in which the rotor gear 1213 is fitted into the through hole 1601. As a result, the wave generator 160 rotates with the rotation of the rotor 121.

Incidentally, at the ends of the wave generator 160, flange sections 1602 projecting in the outer circumferential direction are provided. The flange sections 1602 prevent the flexible spline 162 from coming off, the flexible spline 162 disposed on the periphery of the wave generator 160. Incidentally, in FIG. 16, a state in which one of the flange sections 1602 is detached for attaching the flexible spline 162 is shown. The detached flange section 1602 is fixed with the fastening bolts FB after the flexible spline 162 is disposed.

The flexible spline 162 is an annular member which is flexible and can be deformed according to the rotation of the wave generator 160, and gear teeth 162t are formed on an outer periphery thereof. Moreover, on an inner periphery of the flexible spline 162, a bearing 161 for making the rotation of the wave generator 160 smooth is disposed.

The circular spline 165 has a front part 1651 which is housed in the concave section 1212 of the rotor 121 and houses the flexible spline 162 and a back part 1652 through which the central shaft 110 is placed, the back part 1652 to which the rotating shaft of the external load EL is connected. The front part 1651 has, on an inner periphery thereof, gear teeth 165t which engage with the gear teeth 162t of the flexible spline 162. Between the back part 1652 and the central shaft 110, the bearing sections 112 for making the circular spline 165 rotatable are disposed.

Figure 17:
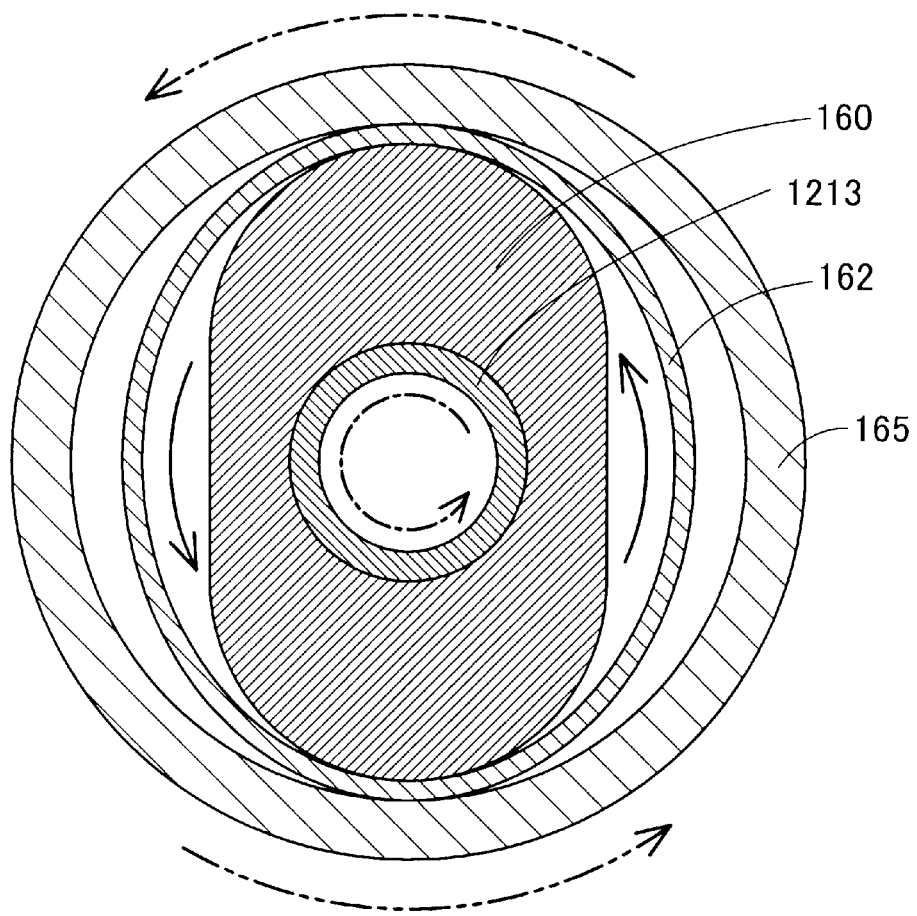
FIG. 17 is a schematic diagram for explaining a mechanism by which a rotational driving force is transferred in the power generating apparatus of the fourth embodiment.

FIG. 17 is a schematic diagram similar to that of FIG. 14, the schematic diagram for explaining a mechanism by which a rotational driving force is transferred in the power generating apparatus 100C. Incidentally, in FIG. 17, the bearing 161 provided inside the flexible spline 162 is not shown. In the power generating apparatus 100C, with the rotation of the rotor gear 1213 (shown by an arrow indicated by an alternate long and short dashed line), the wave generator 160 rotates (shown by arrows indicated by solid lines).

The wave generator 160 presses the flexible spline 162 against the circular spline 165 in a major-axis direction of the wave generator 160, and thereby makes the flexible spline 162 and circular spline 165 come to contact with each other. As a result, in the major-axis direction of the wave generator 160, the gear teeth 162t (not shown) of the flexible spline 162 and the gear teeth 165t (not shown) of the circular spline 165 engage. Incidentally, in a minor-axis direction of the wave generator 160, the flexible spline 162 and the circular spline 165 are not in contact with each other.

As a result of connection between the flexible spline 162 and the circular spline 165 in the major-axis direction of the wave generator 160, the rotation of the wave generator 160 is transferred to the circular spline 165. Incidentally, in FIG. 17, the direction of rotation of the circular spline 165 is shown by arrows indicated by chain double-dashed lines.

Since the harmonic drive mechanism can generally omit backlash, the harmonic drive mechanism can transfer rotation with a high degree of accuracy. In the power generating apparatus 100C of the fourth embodiment, the rotation mechanism section 130C forming the harmonic drive mechanism is integrally housed in the concave section 1212 of the rotor 121. Therefore, with the power generating apparatus 100C, it is possible to form an actuator and a manipulator which are compact and operate with a high degree of accuracy.

F. Fifth Embodiment

Figure 18:
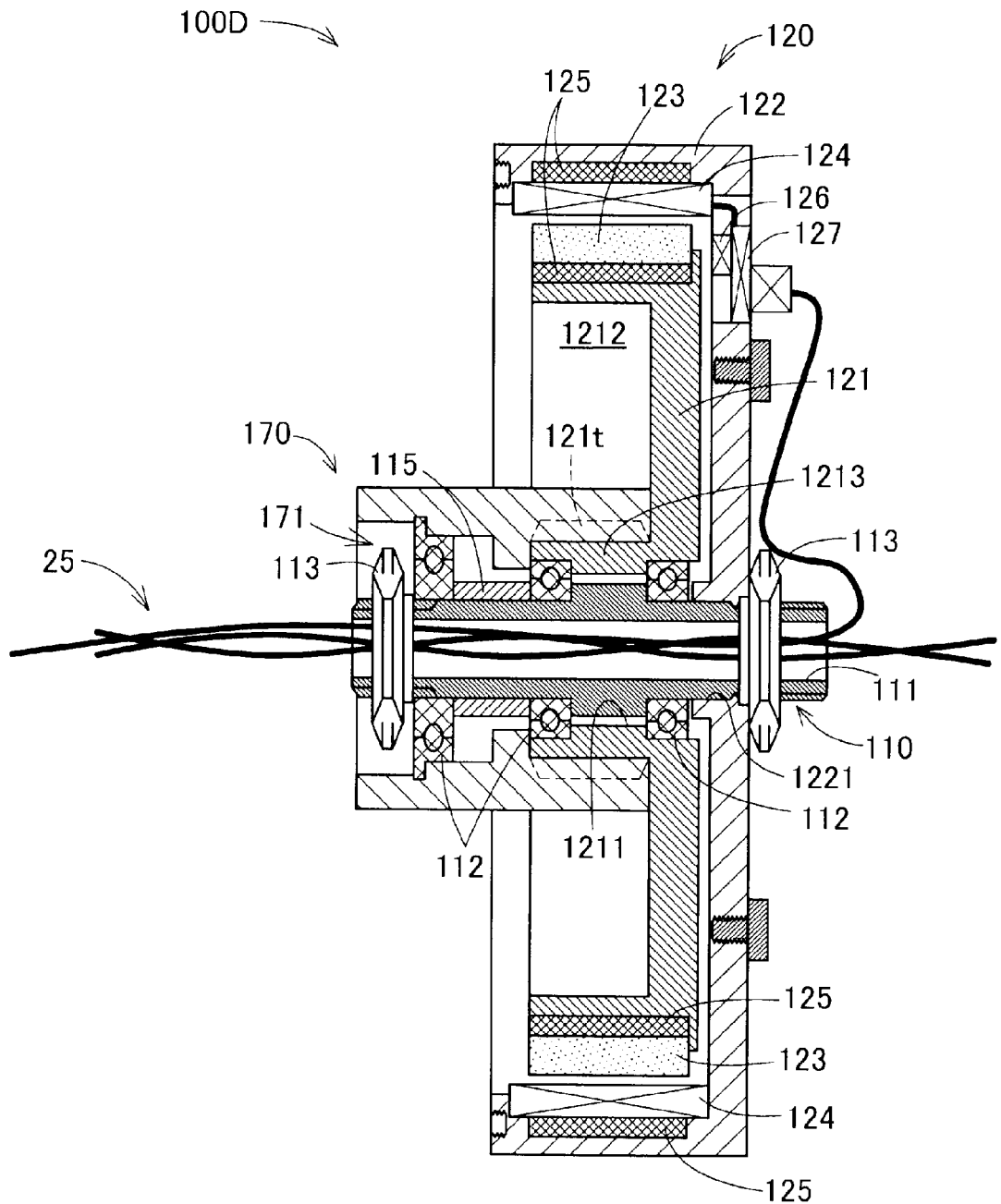
FIG. 18 is a schematic sectional view showing the structure of the power generating apparatus of a fifth embodiment.

FIG. 18 is a schematic sectional view showing the structure of a power generating apparatus 100D as a fifth embodiment of the invention. FIG. 18 is almost the same as FIG. 3 except that, in place of the rotation mechanism section 130, a rotating shaft 170 is provided. In the power generating apparatus 100D, the rotating shaft 170 is attached to the rotor gear 1213 of the rotor 121 in an exchangeable manner.

The rotating shaft 170 has a through hole 171 through which the central shaft 110 is placed in the axial direction. On an inner wall surface of the through hole 171, the inner wall surface close to the rotor 121, gear teeth are provided so that the rotor gear 1213 is housed and fitted into the through hole 171. Moreover, on the side of the through hole 171 away from the rotor 121, the bearing section 112, the bearing ring 113, and the spacer 115 are disposed. In this structure, the rotating shaft 170 rotates with the rotor 121.

Figure 19A:
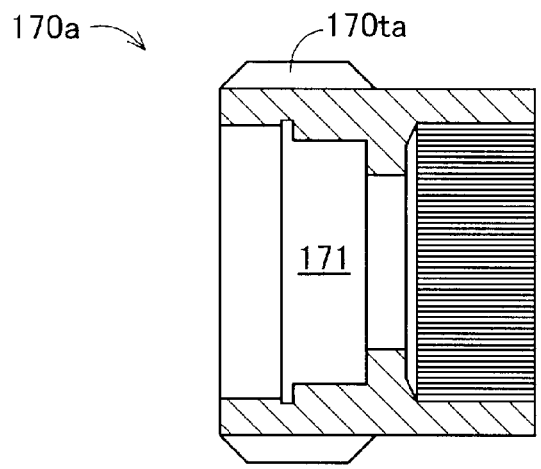
FIGS. 19A to 19C are schematic diagrams showing an example of the type of rotating shaft which is attached to the power generating apparatus of the fifth embodiment.
Figure 19B:
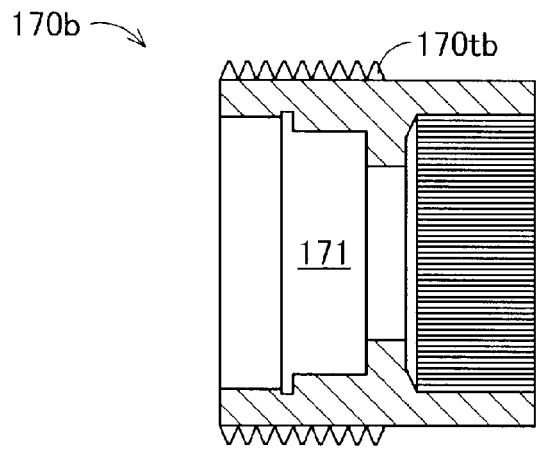
Figure 19C:
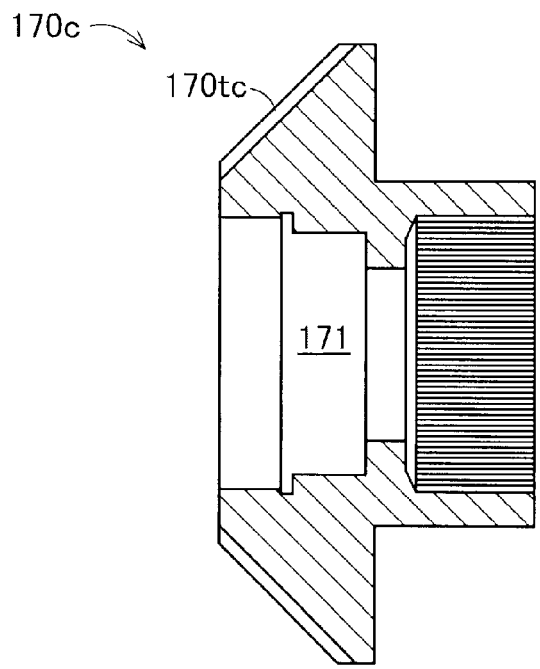

FIGS. 19A to 19C are schematic diagrams showing an example of the type of rotating shaft which is attached to the rotor 121 in the power generating apparatus 100D in place of the rotating shaft 170. A rotating shaft 170a of FIG. 19A has linear gear teeth 170ta on an outer surface on the front end side (the left side of the drawing) and functions as a spur gear. A rotating shaft 170b of FIG. 19B has gear teeth 170tb extending in a spiral fashion on the front end side and functions as a screw gear (a spiral gear). A rotating shaft 170c of FIG. 19C has tapered gear teeth 170tc on the front end side and functions as a bevel gear.

As described above, in the power generating apparatus 100D of the fifth embodiment, various types of rotating shafts, the rotating shafts 170 and 170a to 170c, are attached to the rotor 121 of the motor section 120 in an exchangeable manner. This improves the flexibility of the power generating apparatus 100D. Incidentally, part of each of the rotating shafts 170 and 170a to 170c which are used in the power generating apparatus 100D is housed in the concave section 1212 of the rotor 121. That is, the power generating apparatus 100D is made smaller by that part.

G. Modified Examples

It is to be understood that the invention is not limited to the examples and embodiments described above and the invention may be carried out in various manners within the scope of the subject matter of the invention. For example, the following modifications are possible.

G1. Modified Example 1

In the first embodiment described above, the power generating apparatus 100 is used as a power source of the joint sections J1 to J3 of the robotic arm 10. However, the power generating apparatus 100 of the first embodiment and the power generating apparatuses 100A to 100D of the other embodiments may be used as power sources of other actuators and manipulators or a power source of a mobile unit and so on.

G2. Modified Example 2

In the embodiments described above, the power generating apparatuses 100 and 100A to 100D transfer a rotational driving force generated in the motor section 120 to an external load. However, the power generating apparatuses 100 and 100A to 100D may function as a power generator that generates electric power in the motor section 120 by a rotational driving force transferred from the external load. As described above, the invention is not limited to a power generating apparatus that generates power by using an electromagnetic force; the invention can be applied to an electromechanical device that converts power to and from electric power by using a rotor, a stator, and a rotation mechanism.

G3. Modified Example 3

In the embodiments described above, all or part of the rotation mechanism such as a planet gear or a harmonic drive mechanism is housed in the concave section 1212 of the rotor 121. That is, the power generating apparatus is so structured that, as seen in a direction perpendicular to the central shaft 110, the rotor 121 and all or part of the rotation mechanism overlap. However, all or part of the other rotation mechanism may be housed in the concave section 1212 of the rotor 121. For example, a rotation mechanism which transfers the rotation of the rotor 121 by using the rotation of a chain or a belt may be housed in the concave section 1212 of the rotor 121.

G4. Modified Example 4

In the embodiments described above, the conductive line bundle 25 is placed through the through hole 111 of the central shaft 110. However, the through hole 111 of the central shaft 110 may be omitted, and the conductive line bundle 25 may be laid outside the power generating apparatuses 100 and 100A to 100D.

G5. Modified Example 5

In the embodiments described above, the rotor 121 has the concave section 1212 formed as a nearly annular groove as a space for housing the rotation mechanism. However, the rotor 121 may have a space having a different structure as a space for housing the rotation mechanism. For example, the rotor 121 may be formed as a structure having a cage-shaped frame which is cylindrical in shape, and a space in the frame may be used as a space for housing the rotation mechanism.

The present application claims the priority based on Japanese Patent Applications No. 2010-213965 filed on Sep. 24, 2010, the disclosures of which are hereby incorporated by reference in their entireties.

What is claimed is:

1. An electromechanical device, comprising:
   a central shaft;
   a rotor having a through hole receiving the central shaft and having a rotor magnet disposed along the periphery of the central shaft;
   a plurality of bearing sections between the central shaft and the rotor and providing for rotation of the rotor about the central shaft;
   a stator disposed on the periphery of the rotor; and a rotation mechanism connected to the rotor and used for transfer of a rotational driving force, wherein in the rotor, between the central shaft and the rotor magnet, a space which opens in at least one of an axial direction of the central shaft and houses at least part of the rotation mechanism is formed.

2. The electromechanical device according to claim 1, wherein the central shaft has a through hole extending in the axial direction of the central shaft, and a conductive line sending electricity for controlling the rotation of the rotor is placed through the through hole.

3. An actuator comprising:

the electromechanical device according to claim 2.

4. The electromechanical device according to claim 1, wherein the rotation mechanism includes a planet gear having a sun gear integrally provided in the rotor and a planetary gear and an outer gear which are disposed in the space and functioning as a speed-increasing gear or a speed reducer.

5. An actuator comprising:

the electromechanical device according to claim 4.

6. The electromechanical device according to claim 1, wherein the rotation mechanism includes a harmonic drive mechanism having a wave generator integrally provided in the rotor and a flexible spline and a circular spline which are disposed in the space.

7. An actuator comprising:

the electromechanical device according to claim 6.

8. An actuator comprising:

the electromechanical device according to claim 1.

9. A motor, comprising:

a central shaft;

a rotor having a through hole receiving the central shaft and having a rotor magnet disposed along the periphery of the central shaft;

a plurality of bearing sections between the central shaft and the rotor and providing for rotation of the rotor about the central shaft; and a stator disposed on the periphery of the rotor;

wherein between the central shaft and the rotor magnet, a space which opens in at least one of an axial direction of the central shaft and houses at least part of a rotation mechanism connected to the rotor and used for transfer of a rotational driving force is formed.

* * * * *